(12) United States Patent
Novak et al.

(10) Patent No.: US 9,288,024 B2
(45) Date of Patent: *Mar. 15, 2016

(54) SYSTEMS AND METHODS FOR UPLINK SIGNALING USING TIME-FREQUENCY RESOURCES

(75) Inventors: Robert Novak, Ottawa (CA); Mo-Han Fong, Ottawa (CA); Sophie Vrzic, Nepean (CA); Jun Yuan, Ottawa (CA); Dong-Sheng Yu, Ottawa (CA); Jianglei Ma, Kanata (CA)

(73) Assignee: Apple Inc., Cupertino, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/617,224

(22) Filed: Sep. 14, 2012

(65) Prior Publication Data

US 2013/0010748 A1  Jan. 10, 2013

Related U.S. Application Data

(63) Continuation of application No. 12/677,438, filed as application No. PCT/CA2008/001608 on Sep. 11, 2008.

(60) Provisional application No. 60/971,608, filed on Sep.

(Continued)

(51) Int. Cl.
  *H04W 4/00* (2009.01)
  *H04L 5/00* (2006.01)

(52) U.S. Cl.
  CPC ............ *H04L 5/0044* (2013.01); *H04L 5/0007* (2013.01); *H04L 5/0037* (2013.01); *H04L 5/0053* (2013.01)

(58) Field of Classification Search
  CPC .................................................... H04L 5/0007

USPC .......................................... 370/328, 329, 330
See application file for complete search history.

(56) References Cited

U.S. PATENT DOCUMENTS 6,888,817 B1  5/2005  Shyy et al.
7,912,425 B2  3/2011  Ihm et al.
(Continued)

FOREIGN PATENT DOCUMENTS

KR  1020050014315  2/2005
KR  1020070034039  3/2007
(Continued)

OTHER PUBLICATIONS

Korean Patent Application No. 10-2014-7001393—Office Action dated Oct. 24, 2014.

(Continued)

*Primary Examiner* — Hassan Kizou
*Assistant Examiner* — Abdelnabi Musa
(74) *Attorney, Agent, or Firm* — Downey Brand LLP

(57) ABSTRACT

Methods, base stations and access terminals for uplink signalling are provided. Resource request channel characteristics such as location in time-frequency, sequence, time slot, are assigned to each access terminal to distinguish their resource requests from the resource requests of other access terminals. Access terminals make requests using a resource request on a resource request channel having the assigned characteristics. The base station can then determine which access terminal transmitted 0 the resource request based on the resource request channel characteristics of the resource request channel upon which the resource>request was received. The base station then transmits a response to the request which may for example be a new resource allocation, a default allocation or a renewal of a previous allocation.

30 Claims, 21 Drawing Sheets

Related U.S. Application Data 12, 2007, provisional application No. 61/046,596, filed on Apr. 21, 2008, provisional application No. 61/050,303, filed on May 5, 2008, provisional application No. 61/094,159, filed on Sep. 4, 2008.

(56) References Cited

U.S. PATENT DOCUMENTS

| | | | |
|---|---|---|---|
| 2002/0045448 A1 | 4/2002 | Park et al. | |
| 2002/0080024 A1 | 6/2002 | Nelson et al. | |
| 2004/0109426 A1 | 6/2004 | Veerepalli et al. | |
| 2004/0190471 A1 | 9/2004 | Bender et al. | |
| 2004/0228267 A1 | 11/2004 | Agrawal et al. | |
| 2004/0233885 A1* | 11/2004 | Helmke | 370/348 |
| 2005/0041573 A1 | 2/2005 | Eom et al. | |
| 2005/0243744 A1 | 11/2005 | Tan | |
| 2006/0013178 A1 | 1/2006 | Seguin | |
| 2007/0047495 A1* | 3/2007 | Ji et al. | 370/335 |
| 2007/0049322 A1 | 3/2007 | Usuda et al. | |
| 2007/0097981 A1 | 5/2007 | Papasakellariou | |
| 2007/0165575 A1 | 7/2007 | Niwano | |
| 2007/0264936 A1 | 11/2007 | Kim et al. | |
| 2008/0090528 A1 | 4/2008 | Malladi | |
| 2008/0186931 A1* | 8/2008 | Prakash et al. | 370/338 |
| 2008/0186997 A1 | 8/2008 | Becker | |
| 2008/0298315 A1 | 12/2008 | Ihm et al. | |
| 2008/0318608 A1* | 12/2008 | Inoue et al. | 455/509 |
| 2009/0016456 A1* | 1/2009 | Li et al. | 375/260 |
| 2009/0022134 A1 | 1/2009 | Chun et al. | |
| 2009/0052381 A1* | 2/2009 | Gorokhov et al. | 370/329 |
| 2009/0052391 A1 | 2/2009 | Park et al. | |
| 2009/0168906 A1 | 7/2009 | Hagerman et al. | |
| 2009/0290538 A1* | 11/2009 | Kim et al. | 370/328 |
| 2010/0091680 A1* | 4/2010 | Chun et al. | 370/252 |
| 2010/0136989 A1 | 6/2010 | Westerberg et al. | |
| 2010/0157933 A1* | 6/2010 | Park et al. | 370/330 |
| 2010/0189040 A1* | 7/2010 | You et al. | 370/328 |
| 2012/0008590 A1* | 1/2012 | Novak et al. | 370/330 |
| 2012/0063409 A1* | 3/2012 | Novak et al. | 370/330 |
| 2012/0134332 A1* | 5/2012 | Lin et al. | 370/329 |

FOREIGN PATENT DOCUMENTS

| | | |
|---|---|---|
| KR | 1020070080144 | 8/2007 |
| KR | 1020070080545 | 8/2007 |
| WO | WO9966645 | 12/1999 |
| WO | WO2007049998 | 5/2007 |
| WO | WO2007091815 | 8/2007 |

OTHER PUBLICATIONS

Korean Patent Application No. 10-2010-7007958—Office Action dated Nov. 17, 2014.
International Search Report for International Application No. PCT/CA2008/001608, Dec. 1, 2008, pp. 2-4.
Draft IEEE 802.16m System Description Document, IEEE 802.16m-08/003r1, dated Apr. 30, 2008, pp. 1-30.
European Patent Application No. 08800312.4—Extended European Search Report dated Jan. 20, 2014.

\* cited by examiner

SYSTEMS AND METHODS FOR UPLINK SIGNALING USING TIME-FREQUENCY RESOURCES

CROSS REFERENCE TO RELATED APPLICATIONS

This application is a Continuation of U.S. patent application Ser. No. 12/677,438, filed on Nov. 12, 2010, which is a National Phase Entry of International PCT Application No. PCT/CA2008/001608 filed Sep. 11, 2008, which claims the benefit of prior U.S. Provisional Application Nos. 60/971,608 filed Sep. 12, 2007, 61/046,596 filed Apr. 21, 2008, 61/050,303 filed May 5, 2008 and 61/094,159 filed Sep. 4, 2008, which are hereby incorporated by reference in their entirety for all purposes.

FIELD OF THE INVENTION

The invention relates to wireless communication, and more specifically to methods and systems for requesting uplink signalling.

BACKGROUND OF THE INVENTION

Uplink (UL) signaling generally refers to transmissions from an access terminal to a base station in a wireless system. Uplink signaling can require significant resources, and may include several component messages such as ACK (acknowledgement)/NAK (negative acknowledgement), CQI (channel quality indicator) feedback in respect of the channel, MIMO (multiple input, multiple output) configuration, pilot channel, and resource requests to name a few specific examples.

Uplink signaling is used for many different applications. Some services may be less delay sensitive, for example FTP (file transfer protocol), HTTP (hyper text transfer protocol), and other services may be more delay sensitive. Examples of some delay sensitive services include VoIP (Voice over internet protocol), video telephony, near-real time video, and gaming.

In addition, some services have other challenges such as a limited bandwidth and power for signaling, frequent transmissions of delay sensitive traffic, a requirement for signaling per packet or and per transmission, large number of mobile stations, variable packet sizes, a requirement for adaptive MCS (modulation and coding schemes) for variable size packets, and a requirement for adaptive resource scheduling.

Some existing solutions have incurred a lot of overhead or delay, and have not been able to accommodate a large number of mobile stations efficiently.

In Draft IEEE 802.16m System Description Document, IEEE 802.16m-08/003r1, dated Apr. 15$^{th}$ 2008, it is stated that:

This [802.16m] standard amends the IEEE 802.16 WirelessMAN-OFDMA specification to provide an advanced air interface for operation in licensed bands. It meets the cellular layer requirements of IMT-Advanced next generation mobile networks.

This amendment provides continuing support for legacy WirelessMAN-OFDMA equipment.

The standard will address the following purpose:
i. The purpose of this standard is to provide performance improvements necessary to support future advanced services and applications, such as those described by the ITU in Report ITU-R M.2072.

FIGS. 7-13 of the present application correspond to FIGS. 1-7 of IEEE 802.16m-08/003r1. The description of these figures in of IEEE 802.16m-08/003r1 is incorporated herein by reference.

SUMMARY

Various approaches to sending a resource request are provided. These include:

the persistent assignment of channel resources for transmission of the resource requests—this can be an entirely new allocation, or can be an allocation of some or all of a set of existing signalling opportunities for resource request transmission purposes;

the superposition of resource requests over other traffic in which case interference cancellation techniques may be used at the base station to remove interference due to the superimposed resource request message;

the superposition of resource requests over other signaling in which case again interference cancellation techniques may be used at the base station to remove interference due to the superimposed resource request message.

A broad aspect provides a method, for execution by a base station or other access network component or components, the method comprising:

assigning a respective set of at least one resource request channel characteristics to each of a plurality of access terminals for each access terminal to use to request uplink transmission resources, each set of at least one resource request channel characteristics being distinct from each other set of at least one resource request channel characteristics;

receiving a resource request on a resource request channel;

determining which access terminal transmitted the resource request based on at least one resource request channel characteristic of the resource request channel upon which the resource request was received;

transmitting a response to the request.

A second broad aspect provides a method in an access terminal, the method comprising:

receiving an assignment of a set of at least one resource request channel characteristic, the set of at least one resource request channel characteristic being distinct from each other set of at least one resource request channel characteristics assigned to another access terminal;

transmitting a resource request on a resource request channel having the set of at least one resource request channel characteristic, the set of at least one resource request channel characteristic identifying the access terminal as a source of the request;

receiving a response to the request.

BRIEF DESCRIPTION OF THE DRAWINGS

Embodiments of the present application will now be described, by way of example only, with reference to the accompanying drawing figures, wherein.

DETAILED DESCRIPTION

Figure 1:
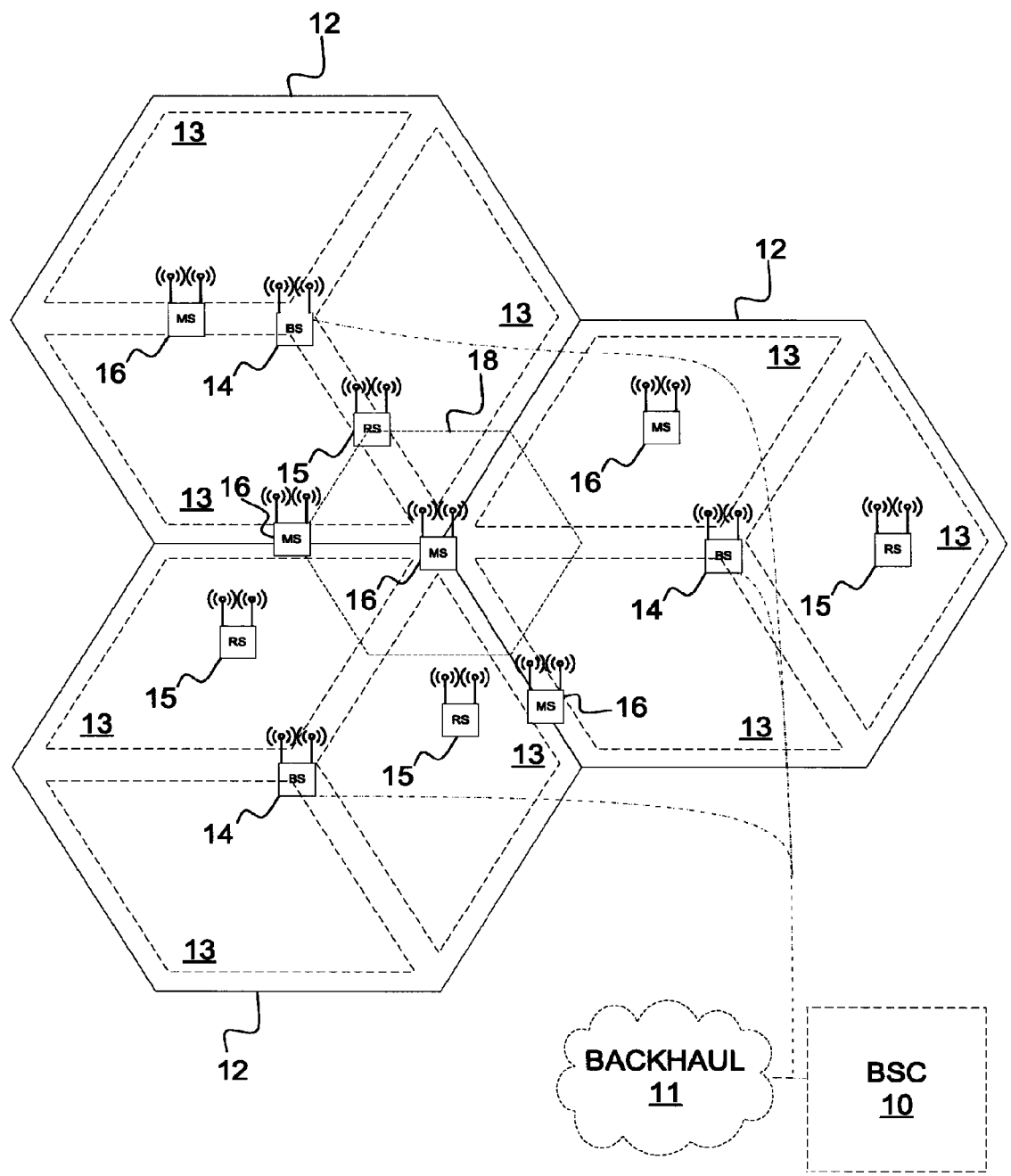
FIG. 1 is a block diagram of a cellular communication system.

Various methods are provided to signal a request for a resource assignment for an UL (uplink) transmission by an access terminal. An access terminal is any device that is used to access a wireless network. Access terminals may be mobile stations or fixed wireless terminal for example. Throughout this description, such a request is referred to as a "resource request". It is to be understood that this refers generally to a request to be granted an opportunity to make an uplink transmission or transmissions. It is noted that the signaling or other traffic may use a number of transmission methods including but not limited to:

Orthogonal frequency division multiplexing (OFDM) based schemes;

OFDM with subcarrier-hopping sequences; and

Code division separation CDMA based or combinations thereof.

In some implementations the physical resource used comprises OFDM symbols. In some embodiments, these symbols are organized into frames that in turn are composed of sub-frames, each sub-frame containing a plurality of symbols. In some embodiments, a plurality of frames compose a super-frame.

In some embodiments the unit of resource allocation for uplink transmission is a RB (resource block). The physical structure of a resource depends on the system implementation. In some embodiments, on the uplink each resource block is defined as a physically contiguous tile in an OFDM time-frequency space. In other embodiments, on the uplink each resource block is defined as a distributed set of resource tiles.

Some embodiments involve the assignment of a respective set of at least one resource request channel characteristics to each of a plurality of access terminals for each access terminal to use to request uplink transmission resources, each set of at least one resource request channel characteristics being distinct from each other set of at least one resource request channel characteristics. Access terminals can then make a resource request using the assigned set of at least one resource request channel characteristics, and this is used by the base station to determine who sent the request. Examples of characteristics include an assigned unique spreading sequence; an assigned unique location in time-frequency, an assigned time slot. Combinations may also be used, for example a spreading sequence and location in time-frequency in which case the spreading sequence alone need not be unique, and the location in time-frequency need not be unique, but the combination of the spreading sequence and the location is distinct from the combination assigned to other access terminals.

A) Reserved Segment of Time-Frequency or Time-Frequency-Space for UL Signaling

In a first approach, a reserved resource within an uplink transmission resource having time and frequency dimensions is employed and dedicated solely to the purpose of uplink signalling. In some embodiments, the space dimension may be employed for MIMO (multiple input, multiple output) applications. The size, nature, frequency of such reserved resource is implementation specific, and depends upon the nature of the uplink transmission resource.

An OFDM (orthogonal frequency division multiplexing) transmission resource is an example of a transmission resource having time and frequency dimensions. The frequency dimension consists of a set of sub-carriers, and the time dimension consists of OFDM symbol durations.

In some embodiments, the reserved resource is a contiguous block within the time-frequency OFDM transmission resource.

In some embodiments, code division separation is used by the access terminals to distinguish the transmissions of each access terminal and/or to distinguish a type of signaling being performed. For example, in some embodiments each access terminal is assigned a sequence from a set of sequences. Each access terminal transmits its resource request using its assigned sequence. The base station that receives the request can determine which access terminal transmitted the request by determining which sequence was used. In some embodiments, the sequences are orthogonal.

B) Superposition of Resource Request on Traffic and/or Other Signaling

In some embodiments, some or all of the transmission resource used for transmission of the resource requests is the same as that used for traffic and/or other signaling, typically by a different access terminal, within a time-frequency transmission resource space. This is referred to superposition or overlaying of transmissions. In some embodiments resource requests can be overlaid over the entire signaling bandwidth. This approach may provide the advantage of not designating a specific resource set for signaling. In some embodiments, code division separation UL signaling can be used with this method. This type of signaling may be useful for, but not limited to, resource request signaling for delay sensitive applications.

In some such embodiments, after a resource request is detected, it can be removed from the traffic channel over which it was superimposed through interference cancellation (IC).

C) Superposition of Resource Request on Traffic and/or Other Signaling on Persistent Resource In some embodiments, superposition of resource requests over traffic and/or other signaling is performed using a persistent resource. A persistent resource is a transmission resource that is known to the access terminal and the base station that occurs recurringly and as such does not need to be signaled in a detailed manner each time it is to be used. In some embodiments, the persistent resource is a periodic resource assigned to a unique access terminal. In other embodiments, several access terminals may share a persistent resource assignment in which case some collisions may occur. In some embodiments, code division separation UL signaling can be used with this method. This type of signaling is useful for, but not limited to, resource request signaling for delay sensitive applications.

In some such embodiments, after a resource request message is detected, it can be removed from the traffic channel over which it was superimposed through interference cancellation (IC).

D) Superposition of Resource Request on Traffic and/or Other Signaling on Specific Resource or Set of Resources In some embodiments, the superposition of resource requests on traffic and/or other signaling on a specific resource or set of resources is employed. In some embodiments, the transmission of the uplink signaling on a given set of resources indicates the access terminal is requesting assignment on those resources. In some embodiments, an access terminal may be identified by a unique spreading sequence, or set of sequences. In some embodiments, the UL signaling may be sent only over the "first" resource block of a desired assignment.

E) Unique Persistent Resource Assigned to Each Access Terminal or to a Set of Access Terminals In some embodiments, a persistent recurring resource for UL signaling is assigned to each access terminal. This makes detection of the resource request signal relatively simple at the base station, as the base station only need look for a resource request from the particular access terminal on that access terminal's assigned resource. With this approach, there is no contention for the capacity to transmit a resource request. The resource may be dedicated to resource request transmission, or may overlaid over traffic and/or signalling as described in methods B and C above.

In another embodiment, a number of different persistent recurring resources are assigned, and each of the different persistent recurring resource is assigned to one or more access terminals. In this case, there is contention for the capacity to transmit a resource request, but only with other access terminals assigned the same persistent recurring resource. In some embodiments, different spreading codes are assigned to access terminals that are assigned the same persistent recurring resource. The resource may be dedicated to resource request transmission, or may overlaid over traffic and/or signalling as described in methods B and C above.

In some embodiments, this approach is used in conjunction with overlaying the signalling over traffic or other signalling. In a specific example, the following approach is followed:

If an access terminal has packet to transmit, it will transmit-signaling using its assigned resource.

The base station will receive signaling. In response, an assignment is made to the access terminal for uplink transmission.

The BS may have assigned some or all of the resource assigned to the access terminal for resource request signalling to another access terminal in this slot. In some embodiments, for the purpose of receiving the transmission of the other access terminal, interference cancelation can be used to remove the effects of the resource request signalling.

If the access terminal does not have a packet, it does not transmit anything using its assigned resource. The resource is left blank, and no assignment message is sent for that access terminal.

Resource Request Content

Resource request content refers to what is conveyed by the resource request. In some embodiments, this may be spread using one or more spreading sequences as described below.

In some embodiments, the resource request content is only a flag or indicator as opposed to a message that might include additional fields, so that the detection of the flag or indicator is a request for a predefined response from the base station. In some embodiments, the predefined response to the detection of an UL indicator for an access terminal is to assign resources for at one least HARQ (hybrid automatic repeat request) transmission on the UL. As a specific example, the indicator may be a request for a fixed size assignment for VoIP transmission.

In some embodiments, the resource request contains multiple fields including one or more of desired resource, CQI, MIMO method, etc.

In some embodiments, one or more bits are used to indicate: signaling resource for transmission of default parameters and size. For example 1 to 3 bits might be transmitted, each spread using a spreading sequence. Using a specific set of more than one bit can improve detection by reducing false alarm probability. Detection is all that is needed as the sequence(s) are assigned to a specific access terminal or user, and the transmission of this signaling is just to indicate that a packet is ready for transmission at the access terminal. This signaling can be used like a "page" of some kind.

In some embodiments, fields such as PF (packet format)/resource size, CQI with sub-band index (sub-band spans several resources), CRC might be included in the resource request. In some embodiments, the fields included may be variable. For example, a CQI might be included for requests in respect of initial transmissions, and then omitted for requests for retransmissions.

In some embodiments initial resource may be different from subsequent resource requests. An initial resource request is one at that initiates a service, or re-configures such as service. Subsequent requests can be use to renew or maintain such as service.

In some embodiments, the UL resource request for an access terminal is 4-10 bits in size. In some embodiments, the initial resource request message contains limited fields. In a specific example, the request includes QoS and $1^{st}$ transmission spectral efficiency/or access terminal buffer size including CRC. This can be reliably signaled through the use of diversity.

In some embodiments, the resource request is combined with other messages to include other feedback, for example ACK/NAK feedback.

In some embodiments with persistent resource for UL signaling, traffic intended for the access terminal may also use the persistent resource for one or more HARQ transmission.

In some embodiments, several different uplink messages may be multiplexed using a combination of the described methods and procedures.

In some embodiments, the resource request is an indication to the base station that an access terminal requires UL resource(s) on which transmit.

In some embodiments, the resource request is an indication to the base station that an access terminal requires the use of a UL resource(s) previously assigned to it.

The methods for uplink signaling have been described in the context of transmitting resource requests. In other embodiments, one or more of these approaches is used by the access terminal to indicate to the base station one or more parameters associated with an UL assignment or UL assignment scheduling.

More generally still, the embodiments described thus far have focused on providing mechanisms for transmitting resource requests, although as indicated above, these mechanisms may also be used for other types of uplink signalling.

In some embodiments access terminals perform signalling for one or more of initial access to a system, resource request, to trigger renewal of negotiated service, and to propose an allocation re-configuration.

Details on the designs for each type signaling. In addition, an access and resource allocation flow is described. Several signaling structures and channels are described herein. One or more of these structures and channels can be used together, or separately.

In some embodiments, an assignment message transmitted on the downlink to the access terminal containing a resource allocation is also used as a confirmation that the resource request was received. Upon receipt, the access terminal begins UL transmission using the assigned resource, be it a newly assigned resource, or a persistent resource.

Figure 14:
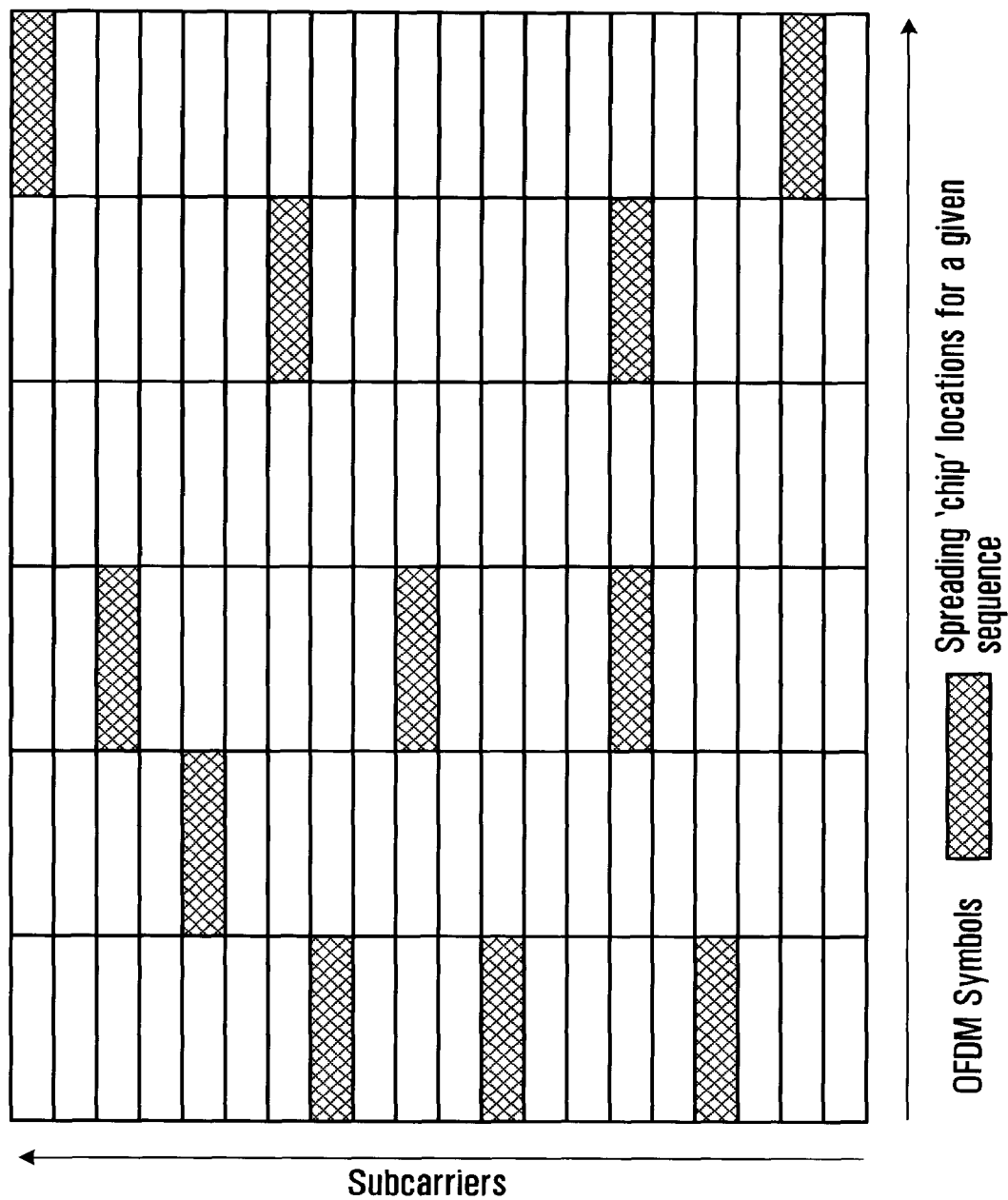
FIG. 14 is an example of a distributed resource for resource request.
Figure 15:
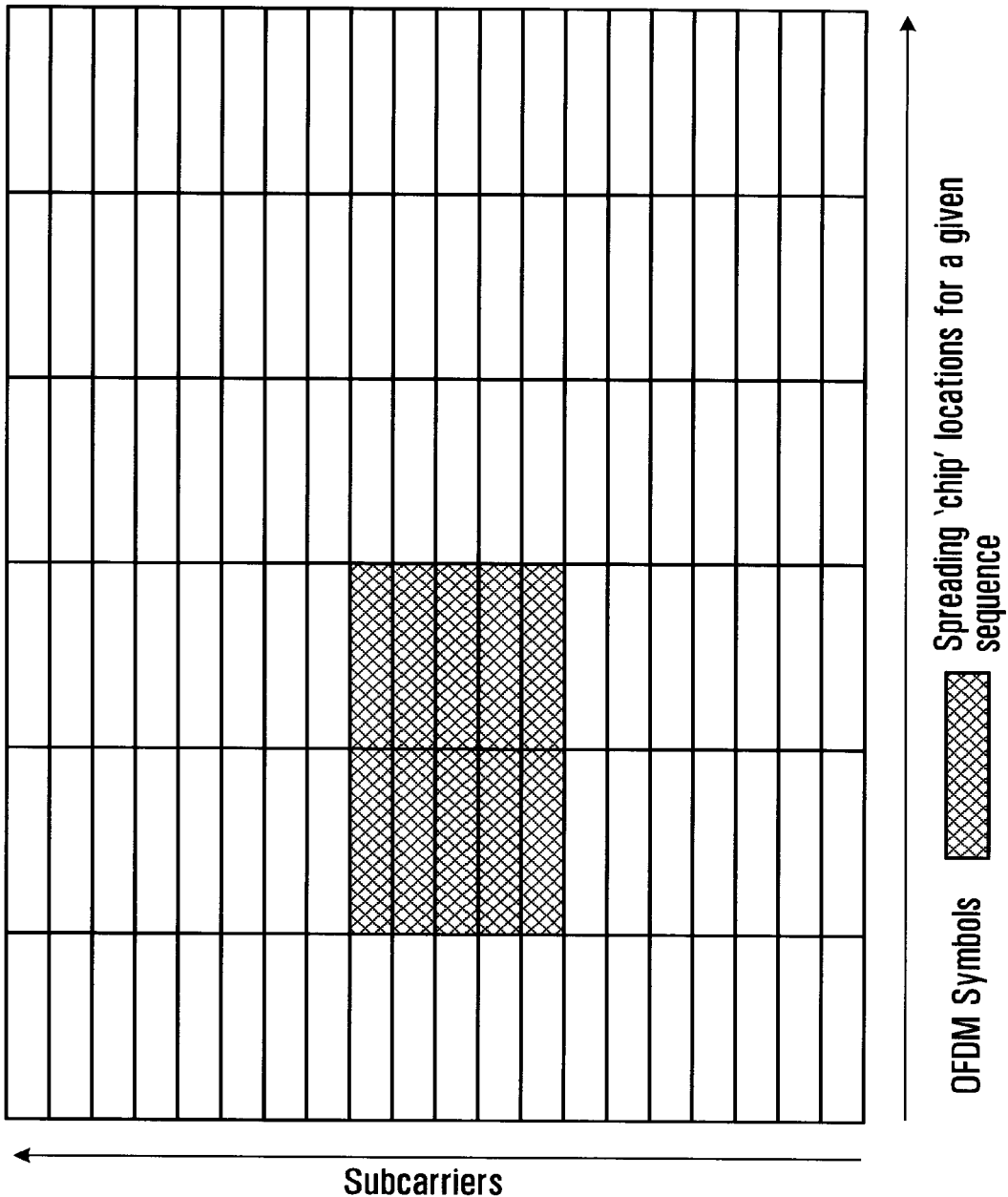
FIG. 15 is an example of a localized resource for resource request.

In some embodiments, the resource request is spread by a spreading sequence. The spreading may be in time, frequency or both time/frequency. For example, the signaling may be spread over a set of subcarriers in one or several OFDM symbols. FIG. 14 shows an example of code division spreading for OFDM transmissions using a distributed resource within an available time-frequency OFDM resource. FIG. 15 shows an example of code division spreading for OFDM transmissions using a contiguous resource. In some embodiment, orthogonal spreading sequences may be used. In other embodiments, non- or orthogonal spreading sequences are used.

For example, a spreading length 128 might be employed, but other lengths are possible.

In some embodiments, direct sequence CDMA may also be used.

In some embodiments, each access terminal is assigned a respective set of sequences to use.

In some other embodiments, all access terminals are assigned the same set of sequences to facilitate detection at the base station.

In some embodiments, orthogonal sequences such as Zadoff-Chu or Walsh sequences may be used.

In some embodiments, the sequence length is less than the capacity of a RB. If N RB's are assigned for each resource request channel, the sequence may be repeated over all RB's.

In some other embodiments, the sequence may be spread over all N RB's.

In some embodiments, signaling can be configured per transmission, per packet, or per multiple packets or with defined combinations of these granularities. In some cases, relatively frequent signaling may reduce some packet delay. Per transmission signaling allow for frequent scheduling of re-transmissions. The reliability of signaling may be reduced if it is per transmission.

In some embodiments, the resources for UL signalling are shared by a set or all access terminals. In some embodiments, the resources for UL signalling may be a large portion or all of the resources.

Selecting Between Transmission Resources

In some embodiments, the access terminal has the capability of selecting between several different persistent resources to transmit its resource request. In some such embodiments, the access terminal selects the persistent resource that has been idle the longest. This may have the effect of reducing the collisions.

Figure 16:
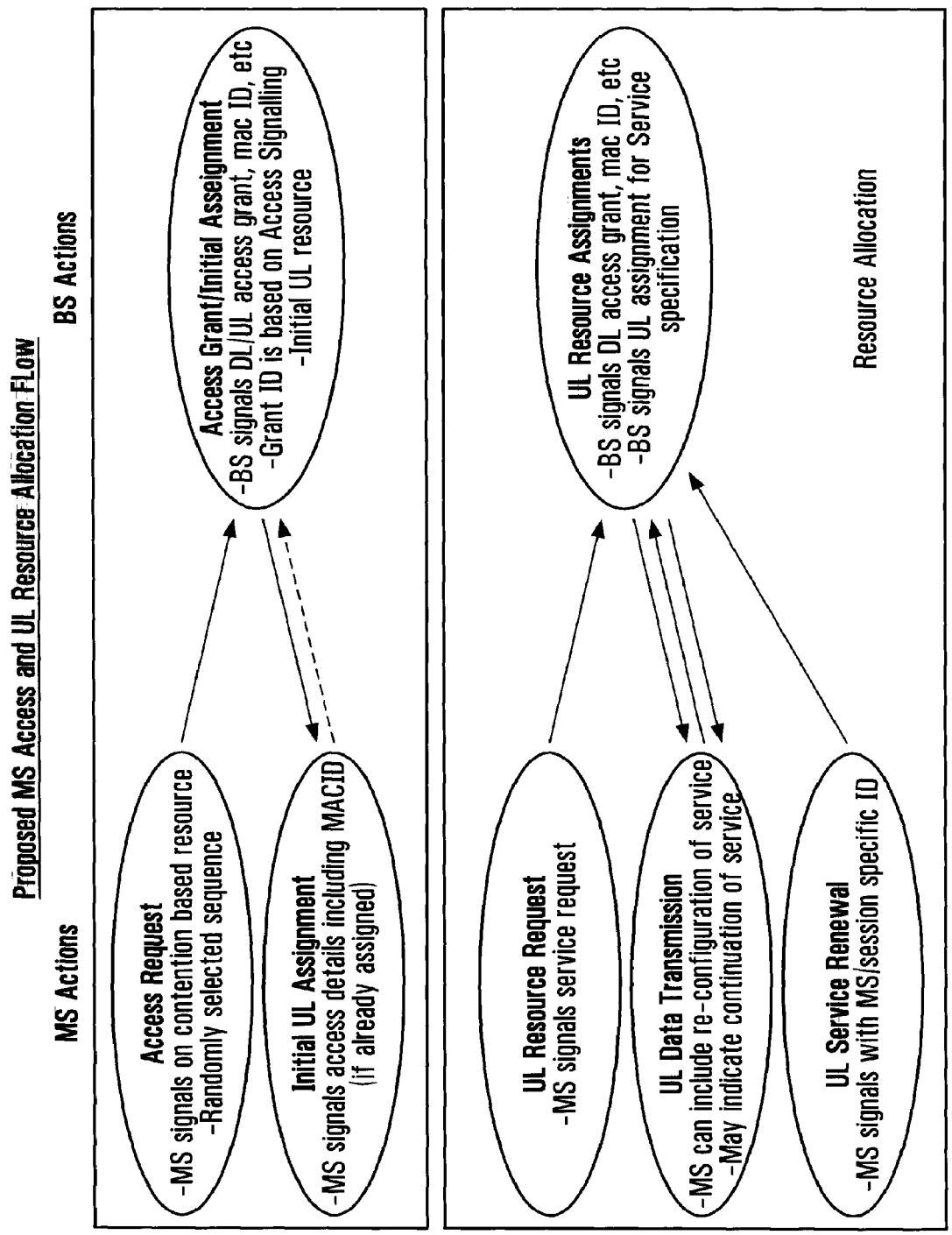
FIG. 16 is an example of an access terminal access and resource allocation flow.

Access Terminal Access and UL Resource Allocation Flow Example—FIG. 16

Referring now to FIG. 16, shown is an example of an access terminal access and UL resource allocation flow. Shown is functionality for initial access, generally indicated at 200, and functionality for resource allocation, generally indicated at 202. An overview of FIG. 16 will be provided first, followed by detailed example implementations for several of the steps. Note that various embodiments may include an arbitrary subset of the steps/functionality shown in FIG. 16.

Initial access 200 begins with an access request in block 204 using a random access channel. The access terminal signals on a contention based resource using a randomly selected sequence from a set of sequences. The base station responds with an access grant in block 206. This can include for example an initial DL/UL access grant, MAC (medium access control) ID, etc. Grant ID is based on access signalling. The "access grant" from the BS is a message sent to the access terminal. In some embodiments, the message is sent with a Grant ID to target the access terminal. As the access terminal may not been identified except to send a "randomly selected sequence", the grant ID in this case can be based in some way the "randomly selected sequence", or access signaling.

In some embodiments, in block 208, using the initial UL assignment, the access terminal signals access details such as MAC ID, if already assigned. At that point, the access terminal has successfully accessed the system. In some embodiments as part of block 208, a re-configuration header is embedded in the first uplink packet transmission, i.e. the packet transmitted using the initial UL assignment, to specify details of a resource request, such as further specifications about the assignment, MIMO mode, backlog of buffer at the access terminal, etc.

Resource allocation 202 begins with a UL resource request at block 210. The access terminal signals an initial resource request that may for example be to start a service. This may for example be performed using a scheduled or non-scheduled resource. The base station responds at block 212 with a UL resource assignment. This may include a DL access grant, etc., and UL assignment for service specification. As indicated below, the access terminal may specify or re-configure the service within the allocation using a MAC header. Next, the access terminal begins UL data transmission 214 using the UL resource thus assigned. In some embodiments, the access terminal then has the option of signalling a re-configuration of the service. This may, for example, be signaled as part of a MAC header of a packet sent using the existing allocation. In some embodiments, the MAC header may be sent alone. In some embodiments, the resource allocation protocol allows the access terminal to signal a renewal of the service. This may, for example, be signaled as part of a MAC header of a packet sent using the existing allocation or a MAC header sent alone. In response, as part of block 212, a further UL resource assignment may be transmitted to the access terminal. At block 216, the access terminal transmits a UL service renewal. This is sent using an access terminal/service specific ID. In response, as part of block 212, a further UL resource assignment may be transmitted to the access terminal. The response is a UL assignment consistent with configuration negotiated before (persistent resource, MIMO mode, size of resource, etc)]

Details of example implementation of several of the blocks shown in FIG. 16 will now be described.

Access Request 204

As indicated above, the process begins when the access terminal attempts to access the system. At this point in common cases, the access terminal has already synchronized with a serving sector. A random access (RA) channel is used for an access terminal to initially access the system. Access to the system may provide the access terminal with an Access terminal ID (such as a MAC ID), and allow the access terminal to receive resource allocations (UL and/or DL) from the base station. The physical structure of the random access channel is implementation specific. Three specific options, each of which will be described in further detail below, include:

Option 1: random access channel uses a designated resource;

Option 2: random access channel is overlaid on UL control resource (superposition with UL control);

Option 3: random access channel is overlaid on wideband UL resources (superposition with traffic, etc).

A common aspect of these options is that the access terminal randomly selects an access channel signaling ID (identifier). The nature of the available signaling IDs is implementation specific. It may for example be a specific spreading sequence, time-frequency location, time slot, interlace, etc. Specific examples are provided below. The set of signaling ID options are known to base stations and access terminals. An index may be associated with each signaling ID option that is also known to the base stations and access terminals.

In some embodiments, in response to a random access channel signal, the base station transmits an assignment message that assigns one or more of the following:

an access terminal ID to the access terminal;

an initial UL resource for the access terminal to provide further information such as access terminal equipment capabilities, etc.;

a possible DL resource assignment requesting information from the access terminal, and additional details (group assignment, base station procedures, etc);

In addition, in some embodiments, the assignment message sent to the access terminal from the base station identifies the base station based on the randomly selected signaling ID option selected by the access terminal for random access. For example, in some cases the control channels are normally generally scrambled in some manner by a sequence associated with the access terminal ID. In some embodiments, in response to a random access signaling (for example during initial access to the system), the base station will send a control message scrambled by a sequence associated with the randomly selected signaling ID instead of the access terminal ID. In some embodiments, the randomly selected signaling ID is an ID specifying one or more parameters such as sequence index, sequence location, etc.

In some embodiments, a subset of the defined signaling ID's are reserved for access terminals that have already been assigned access terminal ID's. An example of such an access terminal is an access terminal that is in hand-off, and is attempting to access a new serving sector. In this case, an access terminal access terminal randomly selects from a first subset of a defined set of random access signaling IDs if it does not yet have an assigned access terminal ID, and a different subset of the defined set of random access signalling IDs if it does have an access terminal ID.

Option 1—Dedicated Resource for UL Access Channel

The first above-referenced option for the UL random access channel involves use of a designated resource allocated for these access requests. A contention based channel for multiple access terminals to request access is employed. The access request is spread and/or repeated across a resource allocated exclusively for initial access. In some embodiments, the resource is allocated for initial access or resource requests. Specific examples are provided below. In the event the resource allocated for the random access channel includes multiple different transmission location possibilities (for example multiple locations in an OFDM time-frequency resource), the access terminal randomly selects a location of the multiple different location possibilities.

In some embodiments, the access terminal randomly selects a sequence from a set of L sequences known to both the access terminal and the base station.

In some embodiments, the sequence length is selected so as to spans N RB's, where N>1.

In some other embodiments, the sequence length is chosen to confine a full sequence to be transmittable using a single RB. For embodiments in which a RB is a contiguous block, and in which the sequences are orthogonal to begin with, by confining spreading sequence transmission to one RB, the spreading sequences maintain substantial orthogonality as a contiguous RB is typically virtually frequency flat.

In some embodiments, the sequences are repeated in each of a plurality RB to gain diversity.

If many resources are assigned for the random access, the resources may be divided into M time-frequency blocks for random access. In such an embodiment, the number of distinct codes+resource combinations per subframe is LM. In some embodiments, the value of M can be dynamically specified by the BS.

In some embodiments, a subframe within a frame or superframe (or otherwise specified set of F frames) for an access request is also randomly selected. In this case, the number of distinct codes+resource+subframes per superframe is LMF.

In some embodiments, the L sequences are an orthogonal set of spreading sequences.

In some embodiments, the L sequences are divided into two groups so as to allow sequence selection to make two types of indications:

1) system access request from an access terminal without previously assigned access terminal ID;

2) system access request from an access terminal with previously assigned access terminal ID.

When an access grant is transmitted in response to such a request, in some embodiments the DL control segment access grant is scrambled by a sequence associated with the randomly selected access ID (e.g. sequence/resource block ID).

Figure 17:
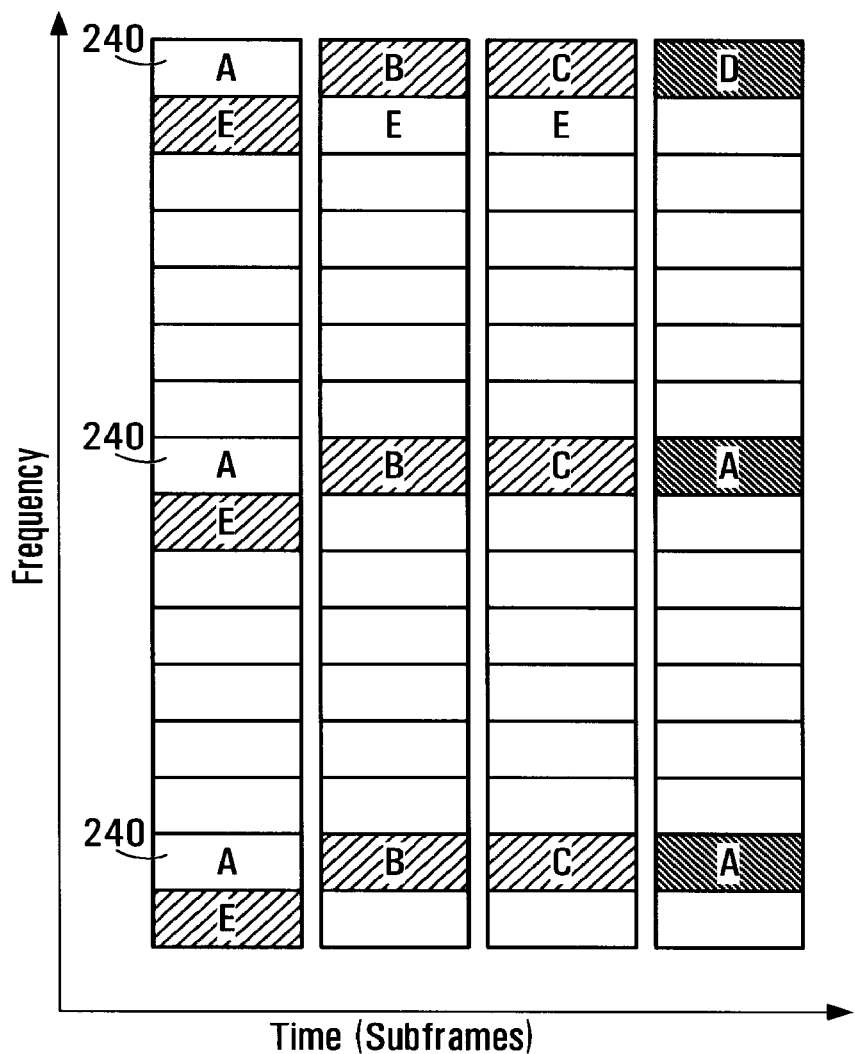
FIG. 17 is a graphical depiction of an initial access channel.

An example of this approach is depicted in FIG. 17. Here, the available resource is an OFDM time-frequency resource. Frequency is on the vertical axis, and time is on the horizontal axis. Each box in FIG. 17, also referred to as a "tile", represents a contiguous set of sub-carriers over a number of OFDM symbols forming a subframe. Note that the entire vertical axis is not shown; it is assumed that there is a set of NM tiles in the vertical direction available for use as access channels, where M is the number of initial access locations per sub-frame, and N is the number of tiles per initial access location. In the illustrated example, N=3, but this is implementation specific. For each of the M initial access locations within a sub-frame, a set of N=3 tiles is assigned. Thus, for example, the three tiles 240 labeled "A" are assigned as one initial access location. Other initial access locations can be assigned for a set of F subframes making up a frame or superframe. F=four in the illustrated example, but this is implementation specific. Within a given access location, any of L different sequences can be used. Thus, the total number of distinct codes+resource+subframes permutations that can be accommodated is given by L×M×F.

In some embodiments, the above-described approach is used for resource requests in addition to, or instead of for requesting access.

Option 2—UL Access Channel Overlaid with UL Control

With this option, the UL random access channel is again a contention based channel for multiple access terminals to request access. The random access requests are overlaid with resources allocated to UL control. The request is spread/repeated across the resources used for Uplink Control (CQI, etc). The access terminal randomly selects the location if multiple possibilities are available.

In some embodiments, the access terminal randomly selects a sequence from a set of L sequences known to both the access terminal and the base station.

In some embodiments, the sequence length is selected to which spans N RB's, where N>1.

In some other embodiments, the sequence length is chosen to confine a full sequence to be transmittable using a single RB. For embodiments in which a RB is a contiguous block, and in which the sequences are orthogonal to begin with, by confining spreading sequence transmission to one RB, the spreading sequences maintain substantial orthogonality as a contiguous RB is typically virtually frequency flat.

In some embodiments, the sequences are repeated in each of a plurality RB to gain diversity.

If many resources are assigned for uplink control, the resources may be divided into M time-frequency blocks for random access. In such an embodiment, the number of distinct codes+resource combinations per subframe is LM. In some embodiments, the value of M can be dynamically specified by the BS.

In some embodiments, the subframe within the frame or superframe (or otherwise specified set of F frames) for an access request is also randomly selected. In this case, the number of distinct codes+resource+superframes per subframe is LMF.

In some embodiments, the L sequences are an orthogonal set of spreading sequences.

In some embodiments, the L-sequences are divided into two types of indications:
  1) system access request from an access terminal without previously assigned access terminal ID;
  2) system access request from an access terminal with previously assigned access terminal ID.

When an access grant is transmitted in response to such a request, the DL control segment access grant is scrambled by a sequence associated with the sequence used to generate the resource request and/or the location of the frequency request in terms of time-frequency location and/or subframe so as to associate the response with the request.

The base station can attempt interference cancellation to remove the RA channel from UL control In some embodiments, the above-describe approach is used for resource requests in addition to, or instead of for requesting access.

Option 3—UL Random Access Channel Overlaid Over Wideband UL Resource

With this option, UL random access channel is a contention based channel for multiple access terminals to request access that employs a resource that is overlaid over the UL resources available for control and traffic. The request is spread/repeated across a portion of the UL channel, possible the entire bandwidth. The access terminal randomly selects the location if multiple possibilities are available.

For this embodiment, random access operation for all access terminals is assigned one length L sequence, and location if multiple possibilities are available.

In some embodiments, the total available resources blocks, $N_T$, may be divided into M time-frequency blocks for random access each defining a respective location for an access sequence. The access sequence spans (through spreading and repetition) $N_T/M=N$ RBs (e.g. N=3).

In this case, the number of possible distinct requests per subframe is M. The access terminal randomly selects one of the M possibilities.

In some embodiments, the subframe within a frame or superframe for the request is also randomly selected by the access terminal.

In some embodiments, the sequences for random access are an orthogonal set of spreading sequences.

In some embodiments, two sequences are defined for two types of indications:
  1) system access request from an access terminal without previously assigned access terminal ID;
  2) system access request from an access terminal with previously assigned access terminal ID.

When an access grant is transmitted in response to such a request, the DL control segment access grant is scrambled by a sequence associated with the location and sequence used so as to uniquely associate the response with the resource request, and effectively identify the access terminal.

In some embodiments, the base station can attempt interference cancellation to remove the RA channel from UL control.

In some embodiments, as an alternative to, or in addition to using interference cancellation, the base station may try decoding UL control and traffic transmissions with two possibilities: with and without the assumption that a random access request was sent.

In some embodiments, the above-described approach is used for resource requests in addition to, or instead of for requesting access.

Access Grant/Initial Assignment 206

If the access terminal has sent a signalling option that indicates it does not have an access terminal ID, then in response to the initial access request, the base station sends a control message containing an access terminal ID scrambled by a sequence associated with the random access signal ID.

If the access terminal has sent a signaling option indicating it does have an access terminal ID, then the base station sends a control message scrambled by a sequence associated with the random access signalling ID, and the response need not contain an access terminal ID. In this case, the access terminal indicates its access terminal ID in the next UL transmission containing details such as access terminal equipment capabilities, etc.

Resource Request 214

Once an access terminal has accessed the system, when the access terminal has information to transmit to the base station, the access terminal needs to request resources on the UL to do so. The specifics of this are implementation specific. Several specific options each of which will be described in detail below include:
  Option 1: use UL control resource;
  Option 2: use random access channel with scrambling sequence;
  Option 3: overlay request on wideband resources; optionally CRC protected.

Option 1—UL Resource Requests Use UL Control Resource

With this option, resource requests are made using dedicated resources within resources allocated to control. Note this is distinct from overlaying the request over the control resource; rather, part of the control resource is used for resource requests rather than other types of control signalling. In some embodiments, the control resource is formed of a set of UL control tiles, a control tile being a contiguous block of time-frequency space allocated for control signalling. In some embodiments, the presence of a resource request is specified by an UL control message type.

In some embodiments, the dedicated UL control resources are specified persistently for each access terminal. In some embodiments, the amount of resource allocated to an access terminal in this manner is different for different frames according to a pre-determined pattern. The sizes are known at the access terminal and base station and do not need to be signaled after configuration.

In some embodiments, the resource request may occupy a field nominally provisioned for some other message, for example CQI, ACK/NAK, precoder index etc. The presence of a request may be specified by the UL control message type. In order to transmit the resource request, the access terminal sets the UL control message type to a message configuration that includes space for a resource assignment. Therefore, the size of the message does not necessarily need to be changed from the specified size for that subframe. With this approach, the presence of the resource request field is dynamic, but does not affect the pre-determined size of the access terminal's UL control resource.

In some embodiments, the resource request is encoded with other UL control data for the access terminal so that resource request can be reliably received.

In some embodiments, the resource request is a single "on/off" indication. In this case, details of the assignment can be given in a re-configuration message, or known from previous or default configurations.

In some embodiments, the resource request is a message. Some details of the assignment such as delay constraints, QoS, packet backlog, resource size, etc. can be indicated in the resource request. Further details of assignment can be given in a re-configuration message, or known from previous or default configurations.

In some embodiments, both the on/off indication and the more detailed resource request message approaches are possible using two different types of resource request message, with a control message type being specified dynamically.

In some embodiments, the UL control resource can be specified by a secondary broadcast channel. In some embodiments, UL resources can be allocated across distributed RB's blocks.

In some embodiments, a resource request is 4-10 bits indicating QoS and $1^{st}$ transmission spectral efficiency/or access terminal buffer size.

Option 2—Resource Requests Use Random Access Channel with Scrambling Sequence

Details of an example access channel design in which access channel sequences/locations are used for define a set of random access signalling IDs have been described above. With this embodiment, a similar approach is used for the purpose of resource requests. In some embodiments, the approach is used both for initial access and resource requests. The UL resource request uses a contention based channel for multiple access terminals to request UL transmission resources. After system access, an access terminal is assigned one of a set of random access signaling IDs (i.e. channel sequences/location). Resource requests are then transmitted using this sequence/channel configuration.

In some embodiments, access terminals may also be assigned specific subframes for resource request opportunities. The presence of signaling in the assigned resource is a unique identifier for an access terminal's resource request.

In some embodiments, a set of signaling ID's are reserved for resource requests that cannot be used for initial access. The assigned sequence/location is a unique identifier for an access terminal's resource request. Each access terminal is assigned one signaling ID to identify signalling as resource request signalling of a particular access terminal.

In some embodiments, each access terminal is assigned one signaling ID from a full set of signaling ID's. In some embodiments, the sequence is scrambled by a resource request specific scrambling sequence to identify the request as a resource request as opposed to a request for initial access. In this case, the assigned sequence/location/scrambling is a unique identifier for a particular access terminal's resource request.

In some embodiments, an access terminal may be assigned multiple signalling ID's for different configured services. For example, an access terminal might be assigned one for VoIP resource requests, one for http traffic resource requests, etc.

In some embodiments in which option 2 is available, if a given access terminal has another mechanism for resource request (for example option 1 described above), and opportunities for requests are frequent the mobile device may not be necessarily assigned signaling for transmitting resource requests in using option 2.

Figure 18:
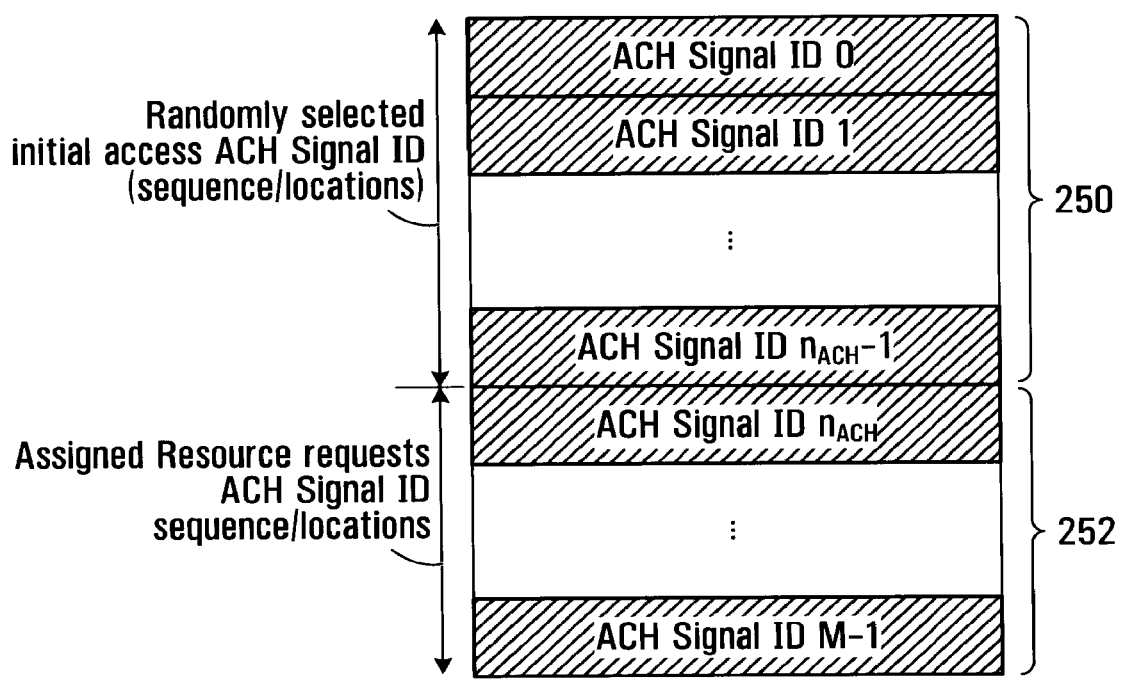
FIG. 18 is a graphical depiction of an access channel used for initial access and resource request.

An example of the approach introduced above in which a set of access channel locations is divided between initial access and resource request utilization will be described with reference to FIG. 18. Shown is a set of access channel locations within a single subframe. The layout is similar to that described previously with reference to FIG. 17. There is a set of M access channels having associated access channel IDs "ACH Signal ID 0", . . . , "ACH Signal ID M−1". Note that the example depicts only a single resource block per access channel, but alternatively multiple resource blocks per access channel maybe defined as in the example of FIG. 17. The access channel locations are divided into two types. The top $n_{ACH}$ locations, generally indicated at 250, are assigned for initial access use. The bottom M-$n_{ACH}$ locations, generally indicated at 252, are assigned for resource request use. In some embodiments, the division of the available locations between initial access and resource requests, as defined by the parameter $n_{ACH}$, is signaled, for example as part of superframe information. In this manner, it can be made configurable based on traffic conditions. As in other embodiments described herein, multiple signalling resources can be assigned to the same access terminal for multiple service requests.

An example of the approach introduced above in which a set of access channel locations is not divided between initial access and resource request utilization, and in which scrambling is used to separate access requests from resource requests will be described with reference to FIG. 19. Shown is a set of access channel locations within a single subframe. The layout is similar to that described previously with reference to FIG. 17. There is a set of M access channel channels having associated access channel IDs "ACH Signal ID 0", . . . , "ACH Signal ID M−1". Note that the example depicts only a single resource block per access channel, but alternatively multiple resource blocks per access channel maybe defined as in the example of FIG. 17.

Figure 19:
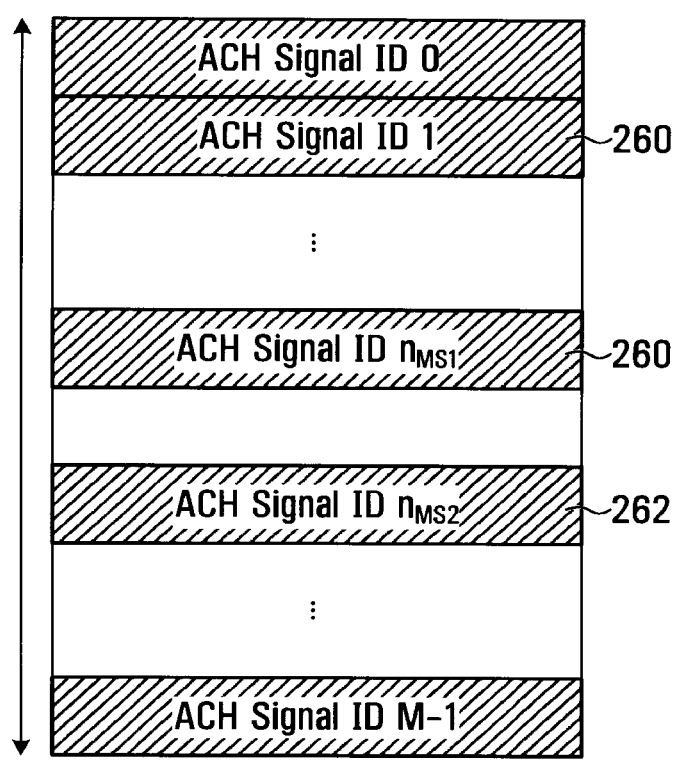
FIG. 19 is another graphical depiction of an access channel used for initial access and resource request.

For the embodiment of FIG. 19, an initial access request specific sequence is employed for access requests. Such a request can be made using any of the M available locations in a subframe that is randomly selected by an access terminal that needs to make an access request. For example the access channel location 260 having "ACH Signal ID 1" might be randomly selected by an access terminal to make an initial access request. In some embodiments, multiple specific sequences are used to specify whether the request is handoff or initial access.

For the embodiment of FIG. 19, a resource request specific sequence is employed for access requests. Each access terminal is assigned a specific location for the purpose of making resource requests. In the illustrated example, access channel location 262 having ACH Signal ID $n_{MS1}$ has been assigned to a first access terminal, and access channel location 264 having ACH Signal ID $n_{MS2}$ has been assigned to a second access terminal. A given access channel location will only contain a resource request if the specific access terminal assigned to the location has transmitted a resource request.

Figure 20:
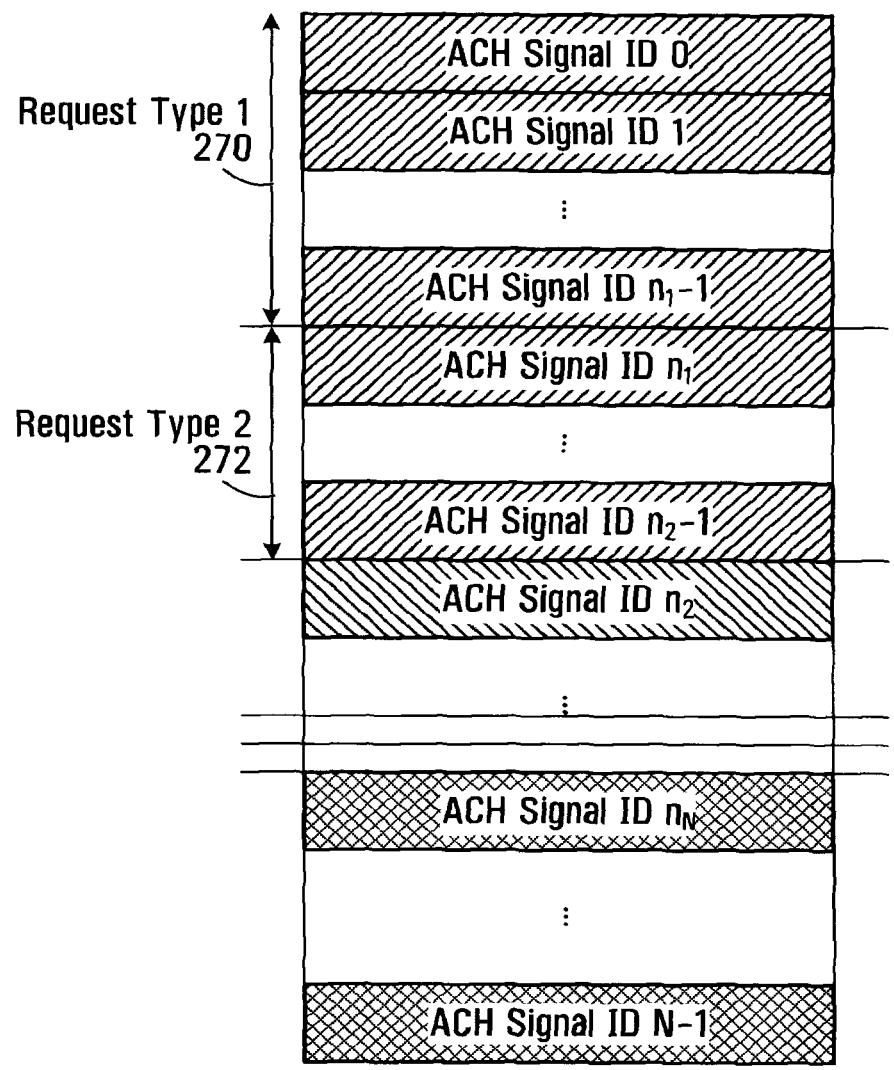
FIG. 20 is another graphical depiction of an access channel used for initial access and resource request.

In yet another example in which the random access channel is used for both initial access and resource requests, the available different signalling IDs are each assigned to one of a plurality of request types. A specific example of such a set of request types includes:
  initial access;
  initial access with already assigned access terminal ID (i.e. handoff);
  Resource request type 1: basic;
  Resource request type 2: renewal of service;
  Resource request type 3: predefined configuration.
  An example of this is depicted in FIG. 20 in which:
  access channel locations identified as ACH Signal ID 0, . . . , ACH Signal ID n1−1 are assigned to request type 1, as generally indicated at 270;
  access channel locations identified as ACH Signal ID n1, . . . , ACH Signal ID n2 are assigned to request type 2, as generally indicated at 272;
  and so on.

In some embodiments, the division of the signalling IDs between the various indications may be configurable by the base station, for example based on traffic.

As in other embodiments described herein, multiple signalling resources can be assigned to the same access terminal for multiple service requests.

Option 3—UL Resource Request Overlaid Request on all UL Resources

With this embodiment, the UL resource request uses resources specified persistently. These may include one or multiple RB's. Multiple RB's may be distributed to provide diversity. The UL resource request is overlaid with other traffic/control on some or all of the same resources as traffic/control.

In some embodiments in which Option 3 is available, if a given access terminal access terminal has another mechanism for resource request (for example option 1 described above), and opportunities for requests are frequent enough, it may not necessarily be assigned signaling for transmitting resource requests using Option 3.

In some such embodiments, interference cancellation is used at the BS to remove the effects of the resource request from other traffic/control transmissions. The resource requests of different access terminals are separated by the location of RB's and/or and subframe, and/or assigned sequences.

UL Data Transmission 210

In some embodiments, as part of a transmission using an existing allocation, an access terminal can embed a header on a packet transmission which can provide details/parameters on configuration, or reconfiguration on an assignment.

After an access terminal has been assigned a UL resource, the assignment can be further configured through additional message(s) embedded in data packet. In some embodiments, the parameters for the first transmission are specified in a resource request, set to default values based on capability negotiation, set to a previous configuration based on renewal, or set in some other manner.

The access terminal can change the assignment parameters by including additional re-configuration message(s) encoded with data packets, to take effect at the start of the next packet transmission. This has the benefit of taking advantage of HARQ for this control message, assuming of course that HARQ is in place for the packet transmission.

In a specific example, a field is appended to a packet prior to encoding, and a field in the header of the packet is used to indicate the presence and/or type of service re-configuration message. After decoding at the base station, the header is examined to determine if an additional re-configuration message has been added to the packet with re-configuration information.

The following is a specific example of header operation:
  2-bit header field to indicate presence, and type of service re-configuration message as follows:
    '00' no change to configuration, no re-configuration message;
    '01' no change to configuration, no re-configuration message, extend service for another packet;
    '10' re-configuration message attached: Type 1
    '11' re-configuration message attached: Type 2

The re-configuration message can contain changes to the existing assignment, or future assignments including for example:
  Mobile power header room;
  Update of capabilities;
  Request for different MIMO mode;
  Request for different MCS;
  Indication of mobile data backlog size;
  Indication to continue assigning UL resources until data backlog is emptied;
  Resource size specification;
  Delay requirement, QoS, etc.;
  Request of an additional service/resource;
  Other transmission parameters.

In some embodiments, the header (and possible message) is added to only a first packet transmission, for example the first packet in a series of packet transmissions (talk spurt, file download, etc.)

In some embodiments, the header (and possible message) is added to the first packet transmission, and every $N^{th}$ packet afterwards, where N can be one or larger.

ACK/NAK of packet transmission from the base station can be used to provide the access terminal with an indication that the re-configuration message was correctly received.

Renewal of Service 216

A renewal for service is signalling transmitted by the access terminal to the base station to indicate a renewal of a configured service. Because it is simply a renewal, the message size can be very small; for example, details such as a size of a requested allocation do not need to be included. The specifics of the channel for transmitting this are implementation specific. Several specific options, each of which will be described in detail below, include:

Option 1: use UL control resource

Option 2: use random access channel with scrambling sequences

Option 1—Renewal Uses UL Control Resource

In this embodiment, after an access terminal has received a UL assignment for a given type of service, the assignment can be renewed through a single renewal message. An existing assignment may have expired, or been stopped (e.g. Silence period in VoIP) or may have only existed for one packet and its HARQ transmissions. In some embodiments the renewal message is simply an ON/OFF toggle to renew service with previous or existing parameters. With this embodiment, the renewal message is sent using part of a persistently assigned UL control resource space. The message may have a message type to indicate that service renewal is being signaled. In some embodiments, an access terminal can be assigned multiple messages to allow toggling of multiple services. In some embodiments, a downlink feedback field is replaced with the renewal message.

In some embodiments, the parameters of the renewal process (i.e. location in the control resource allocated for renewal) for a first transmission are set to a default. In some embodiments, re-configuration in a first transmission can be used to provide parameter changes.

This approach is useful, for example, for an access terminal to switch a VoIP service from inactive to active state.

Option 2—Renewal Uses Use Random Access Channel with Scrambling Sequences

After an access terminal has received a UL assignment for a given type of service, the service can be renewed through a single message. The message may be a simple an ON/OFF toggle to renewal service with previous or existing parameters. In this embodiment, the message is sent using a resource request using a random access resource, such as described above for example, to renew service to the last set of configuration parameters.

In some embodiments, an access terminal can be assigned multiple messages to allow toggling of multiple services.

In some embodiments, the parameters of the renewal process for a first transmission are set to default values.

System with Two Mechanisms for Resource Requests and Renewal Requests

Details have been provided above of the use of a contention based channel (random access channel) approach for resource requests and the use of a contention based channel (random access channel approach for renewal requests. In addition, details have been provided above of the use of control resources for resource requests, and the use of control resources for renewal requests. In another embodiment, two different mechanisms are implemented one of which is contention based, and the other of which uses UL control resources, and a given access terminal chooses between the two mechanisms.

First Mechanism: Contention Based Mechanism for Resource Requests and Renewal Requests An indication is sent to the base station specifying that the access terminal requires a resource assignment. The base station responds with an allocation of a preconfigured resource assignment, a renewal of an existing service, or a default allocation. The further configuration of the resource request can be specified in a MAC message embedded in the transmissions.

The indication occurs using the access channel signaling ID's, but is scrambled by a resource renewal or resource request specific scrambling sequence. In some embodiments, such an indication can also or alternatively be sent on the access terminal specific UL resources.

Second Mechanism: UL Control Resource for Resource/Renewal Request Message

A message is sent to the base station specifying that the access terminal requires a resource assignment along with some parameters of the assignment such as delay constraints, QoS, packet backlog, resource size, etc, to name a few examples of what might be included. This message is sent on the access terminal specific UL control resources.

With this embodiment, the access terminal can choose the form (indication vs. message) and location (random access channel vs. UL control resource) of the transmission. For example, in some cases, the access terminal's assigned UL control resources may occur infrequently, in which case the access terminal might select the random access channel mechanism.

In some embodiments, the sequences are scrambled by sector ID and access/request type. For resource request channel, the request type specifies a request for a pre-configured service or assignment. Multiple request types can distinguish between requests for different services, such as VoIP, data traffic, etc.

Example of a Physical Structure for Uplink Signaling

A detailed example of another physical structure for uplink signalling will now be described. This can be used for some of the UL signalling/resource requests described previously and/or for other uplink signalling purposes such as ACK/NAK, CQI feedback, resources requests, etc. to name a few specific examples.

In some embodiments, the uplink signaling method described here can be used as a mechanism by which the access terminal signals the base station (or other serving transmitter) and uniquely identifies itself to the base station in the process. In this manner the base station knows which specific access terminal sent the UL signaling, and may take appropriate action (for example, a predefined response).

Figure 21:
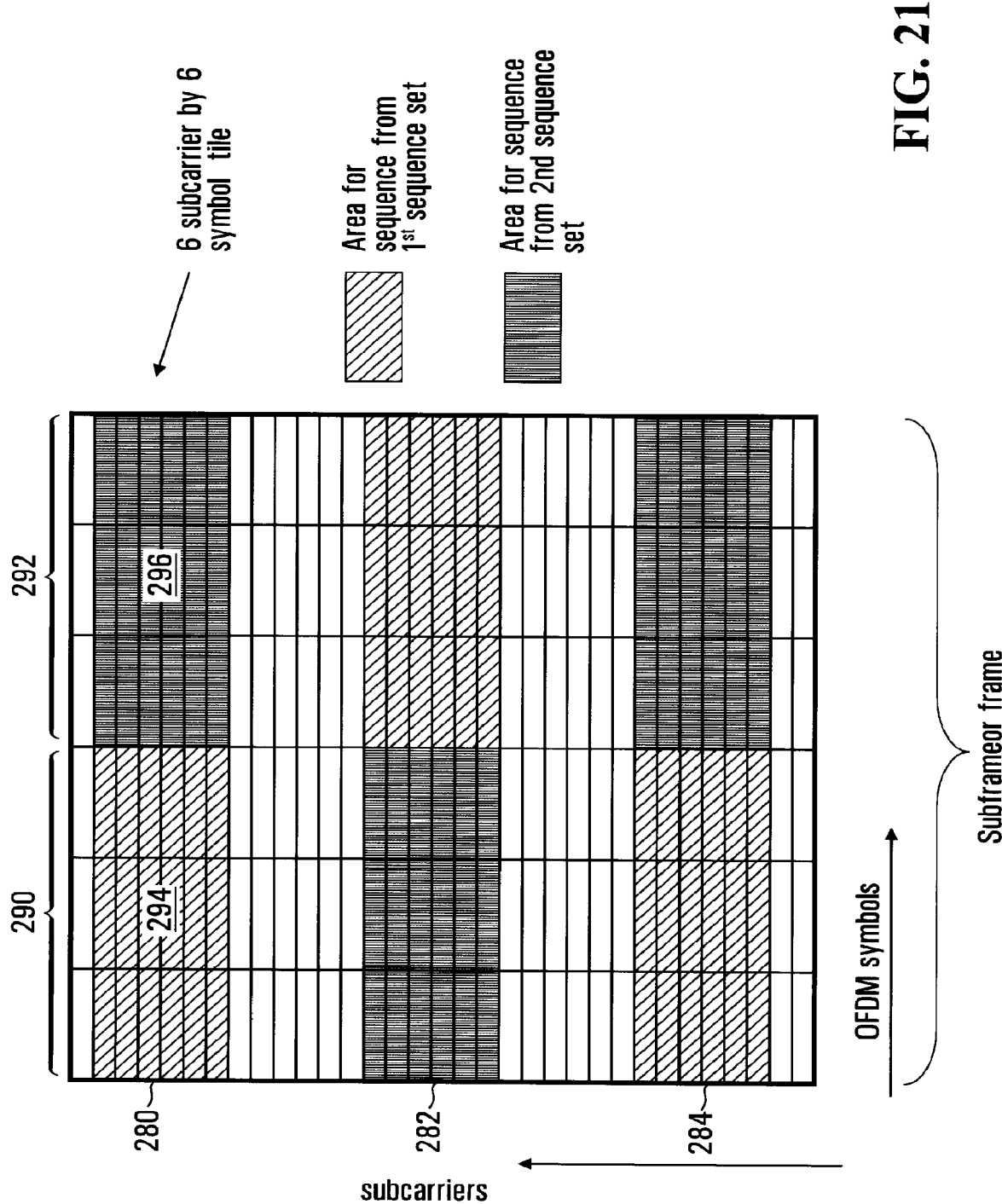
FIG. 21 is a graphical depiction of a tile that is divided into two sections for the purpose of uplink signalling.

A resource is assigned for uplink signaling, for example resource requests that includes a single tile or multiple distributed tiles, where a tile is physically contiguous set of subcarriers and OFDM symbols within a resource set. A specific example is depicted in FIG. 21 in which each tile is 6 subcarriers by 6 symbols, and three such tiles 280, 282, 284 are available for uplink signalling within a subframe or frame.

In some embodiments each tile is divided into different sections. In the illustrated example, each tile 280, 282, 284 is divided into two sections—a first section occurring over the first three OFDM symbols generally indicated at 290 and a second section occurring over the second three OFDM symbols generally indicated at 292. IL should be apparent that this approach can be generalized to the division of tiles into a plurality of sections.

In some embodiments, an access terminal is assigned a respective sequence to be used for UL signaling in each section of the tile. For example, in tile 280, the access terminal uses a sequence from a first sequence set of L1 sequences in section 294, and uses a sequence from a second sequence set of L2 sequences in section 296. The two sequence sets may be the same or different. The number of permutations of pairs of sequences including a sequence from the first set and a sequence from the second set is L1×L2. Each access terminal is uniquely identified by the pair of sequences used. In some cases, more than one access terminal may be assigned the same sequence in one or more of the sequence sets, but not in all sequence sets.

In some embodiments, the mapping of sequences to the tile is repeated to other distributed tiles to exploit frequency diversity. For example, the access terminal that employs tile 280 to transmit its sequences may also use tiles 282 and 284.

In some embodiments, there may be multiple sets of tiles for signaling. The particular set of tiles assigned to the access terminal, in combination with the sequences assigned, uniquely identify the access terminal.

In some embodiments, the spreading sequences used may be orthogonal sequences.

In some embodiments, the manner by which the sequences are mapped can be changed from tile to tile. This is depicted in the example illustrated in FIG. 20 in which the area for the first sequence set occurs during the first three OFDM symbols 290 for tiles 280,284, and occurs during the second three OFDM symbols 292 for tile 282, and in which the area for the second sequence set occurs during the second three OFDM symbols 292 for tiles 280,284, and occurs during the first three OFDM symbols 290 for tile 282.

While the example has focused on the use of this uplink signaling method specifically for resource requests, it can be used for other purposes such as periodic ranging, ranging, CQI feedback, or other notification from the access terminal.

Some embodiments have included the multiplexing of initial access channels and resource request in the same resource, and/or using the same sequences. In some embodiments, the resource request channel is configured according to embodiments described, but independently of the initial access channel which may or may not be present, or other channels described herein. For example, in some embodiments the resource request channel can have structure according to the embodiment described, whereas the random access channel uses an unrelated structure. In addition, in some embodiments it may not be appropriate to share the same OFDM symbol structure for resource request and initial access channels. In these case, the resource request channel, or access channels, can be implemented according to the embodiments herein but applied to each channel independently.

Wireless System Overview

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16 (more generally access terminals), which are within the cell 12 associated with the corresponding base station 14. The movement of the mobile stations 16 in relation to the base stations 14 results in significant fluctuation in channel conditions. As illustrated, the base stations 14 and mobile stations 16 may include multiple antennas to provide spatial diversity for communications. In some configurations, relay stations 15 may assist in communications between base stations 14 and wireless terminals 16. Wireless terminals 16 can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the Internet, both not shown) over a backhaul network 11. In some configurations, a base station controller 10 is not needed.

Figure 2:
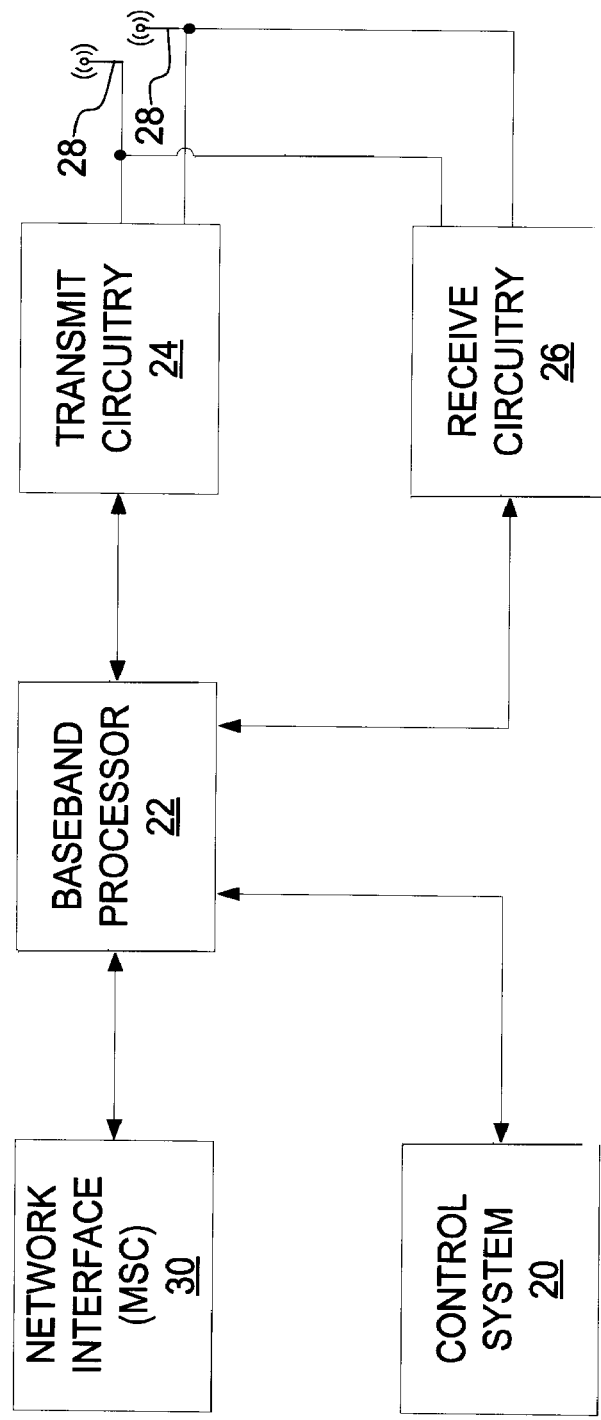
FIG. 2 is a block diagram of an example base station that might be used to implement some embodiments of the present 5 application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile stations 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile station 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
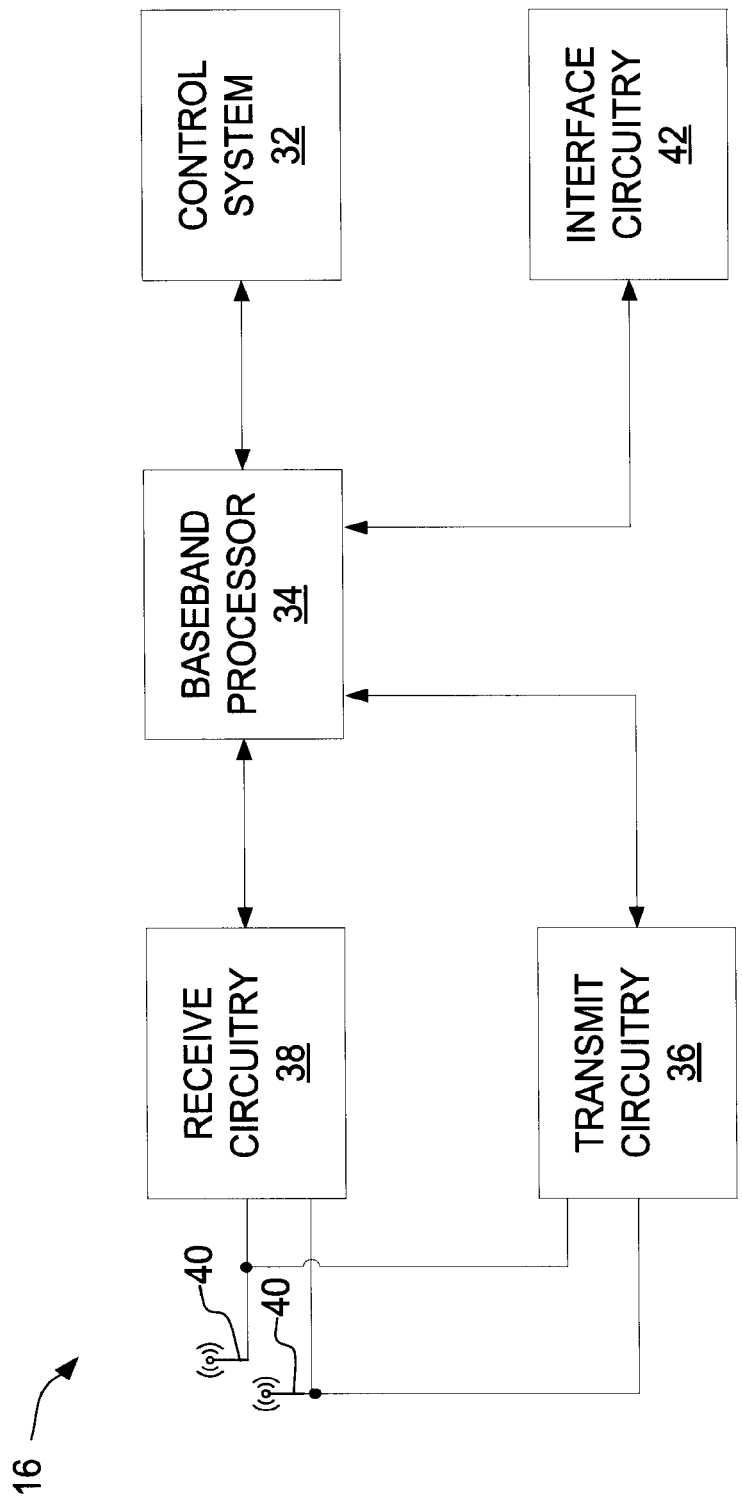
FIG. 3 is a block diagram of an example wireless terminal that might be used to implement some embodiments of the present application.

With reference to FIG. 3, an example of a mobile station 16 is illustrated. Similarly to the base station 14, the mobile station 16 will include a control system 32, a baseband processor 34, transmit circuitry 36, receive circuitry 38, multiple antennas 40, and mobile station interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile station and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, in some embodiments, OFDM is used for at least downlink transmission from the base stations 14 to the mobile stations 16. Each base station 14 is equipped with "n" transmit antennas 28 (n>=1), and each mobile station 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile stations 16.

Figure 4:
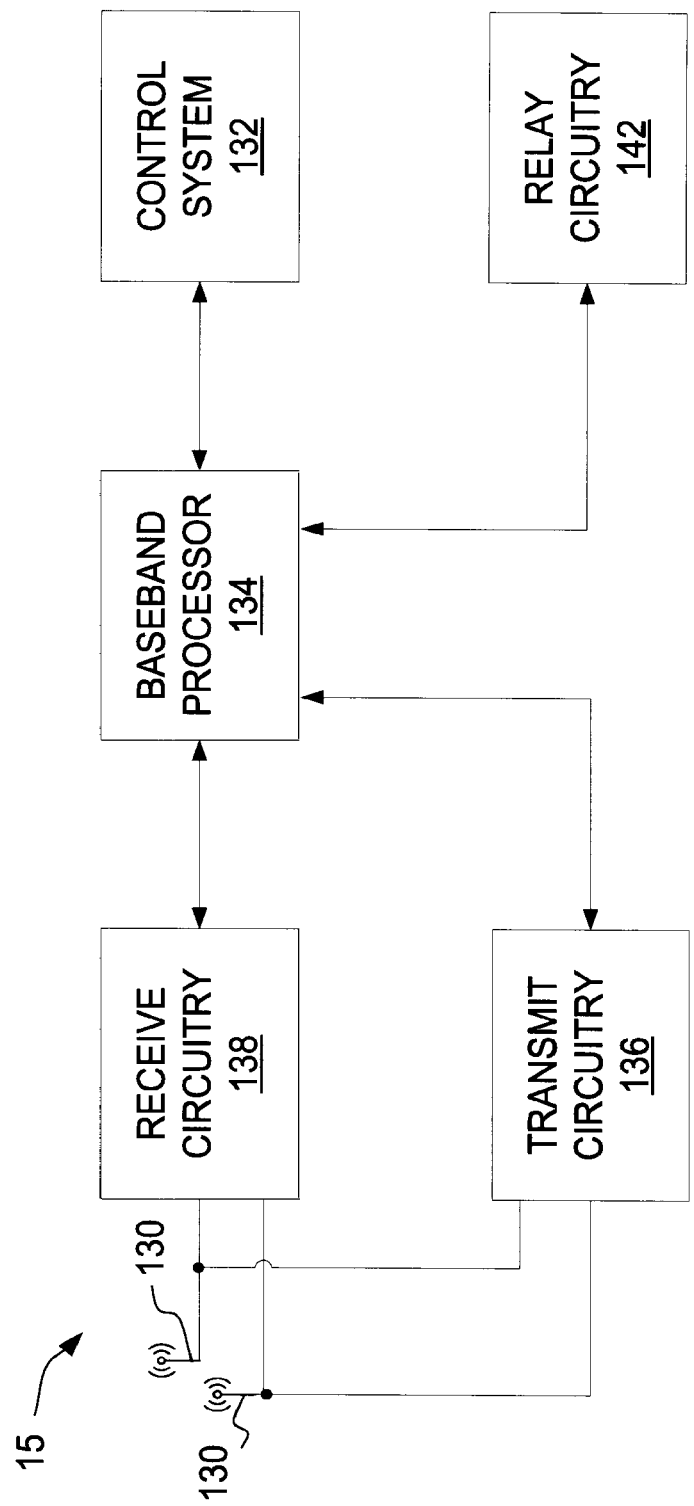
FIG. 4 is a block diagram of an example relay station that might be used to implement some embodiments of the present application.

With reference to FIG. 4, an example of a relay station 15 is illustrated. Similarly to the base station 14, and the mobile station 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile stations 16. The receive circuitry 138 receives radio frequency signals bearing information from one or more base stations 14 and mobile stations 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile station and the base station, either directly or indirectly via a relay station, as described above.

Figure 5:
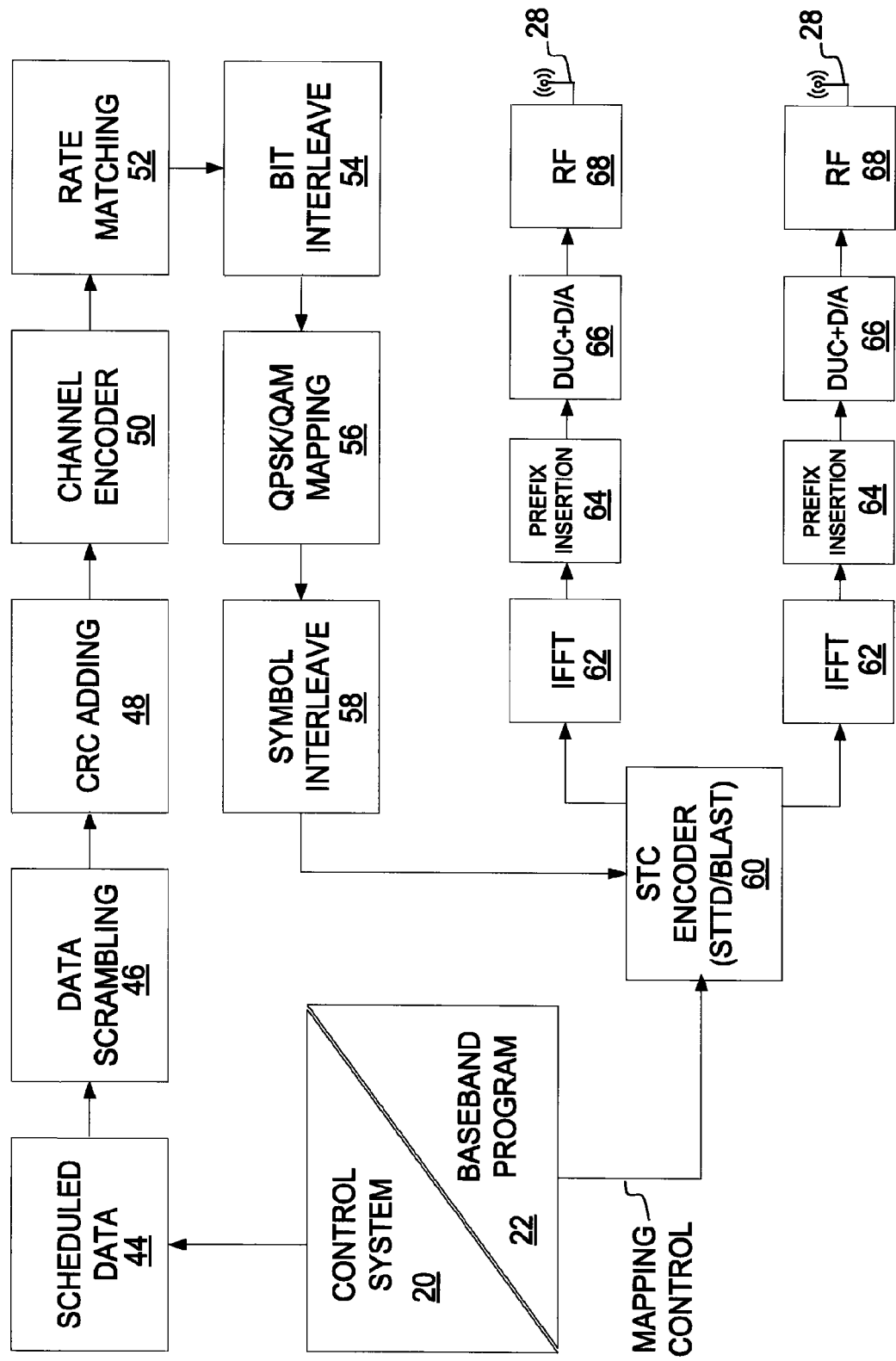
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile stations 16 to the base station 14, either directly or with the assistance of a relay station 15. The base station 14 may use the channel quality indicators (CQIs) associated with the mobile stations to schedule the data for transmission as well as select appropriate coding and modulation for transmitting the scheduled data. The CQIs may be directly from the mobile stations 16 or determined at the base station 14 based on information provided by the mobile stations 16. In either case, the CQI for each mobile station 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile station 16. Again, the channel coding for a particular mobile station 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile station. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile station 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile station 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile station 16 are scattered among the sub-carriers. The mobile station 16, which is discussed in detail below, will use the pilot signals for channel estimation.

Figure 6:
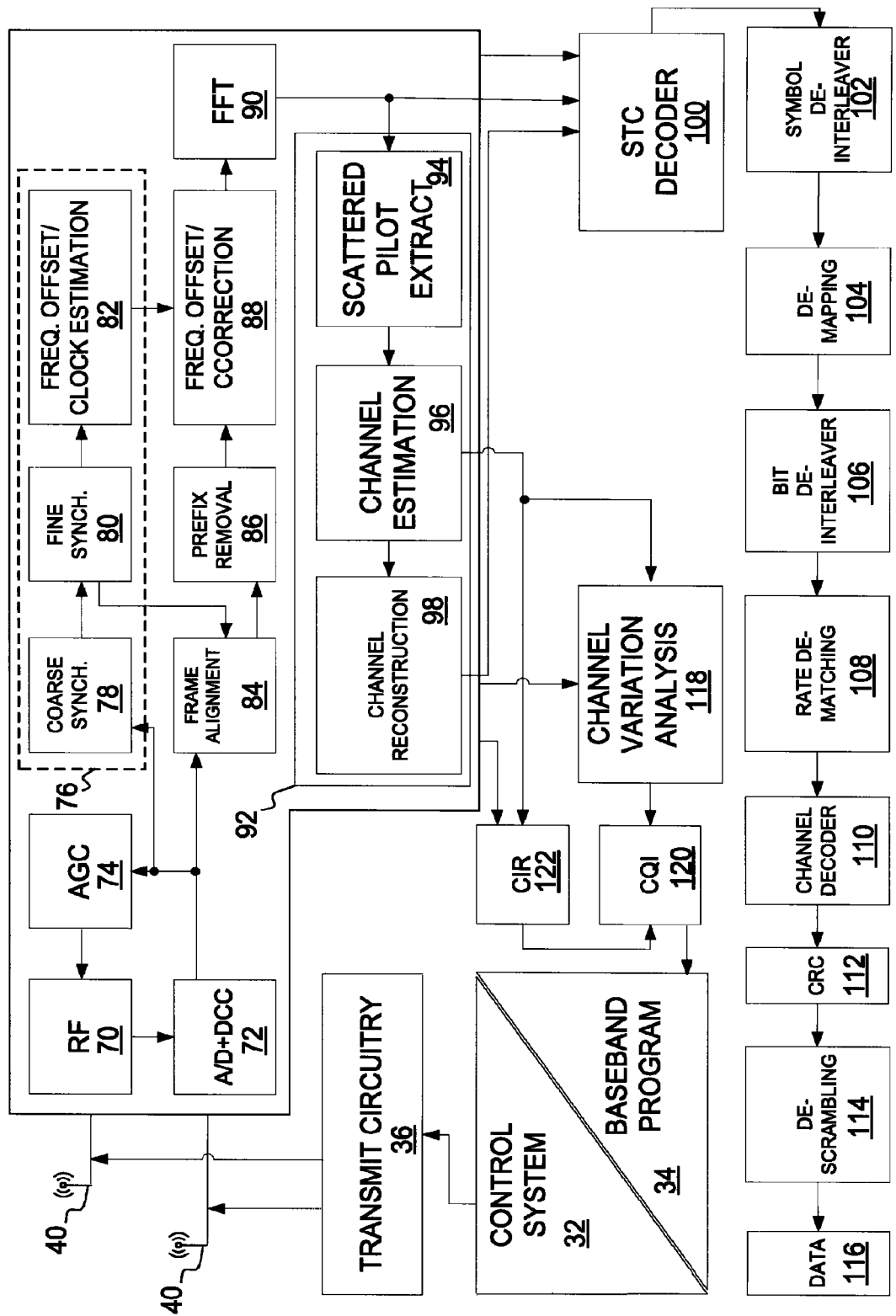
FIG. 6 is a block diagram of a logical breakdown of an example OFDM receiver architecture that might be used to implement some embodiments of the present application.
Figure 7:
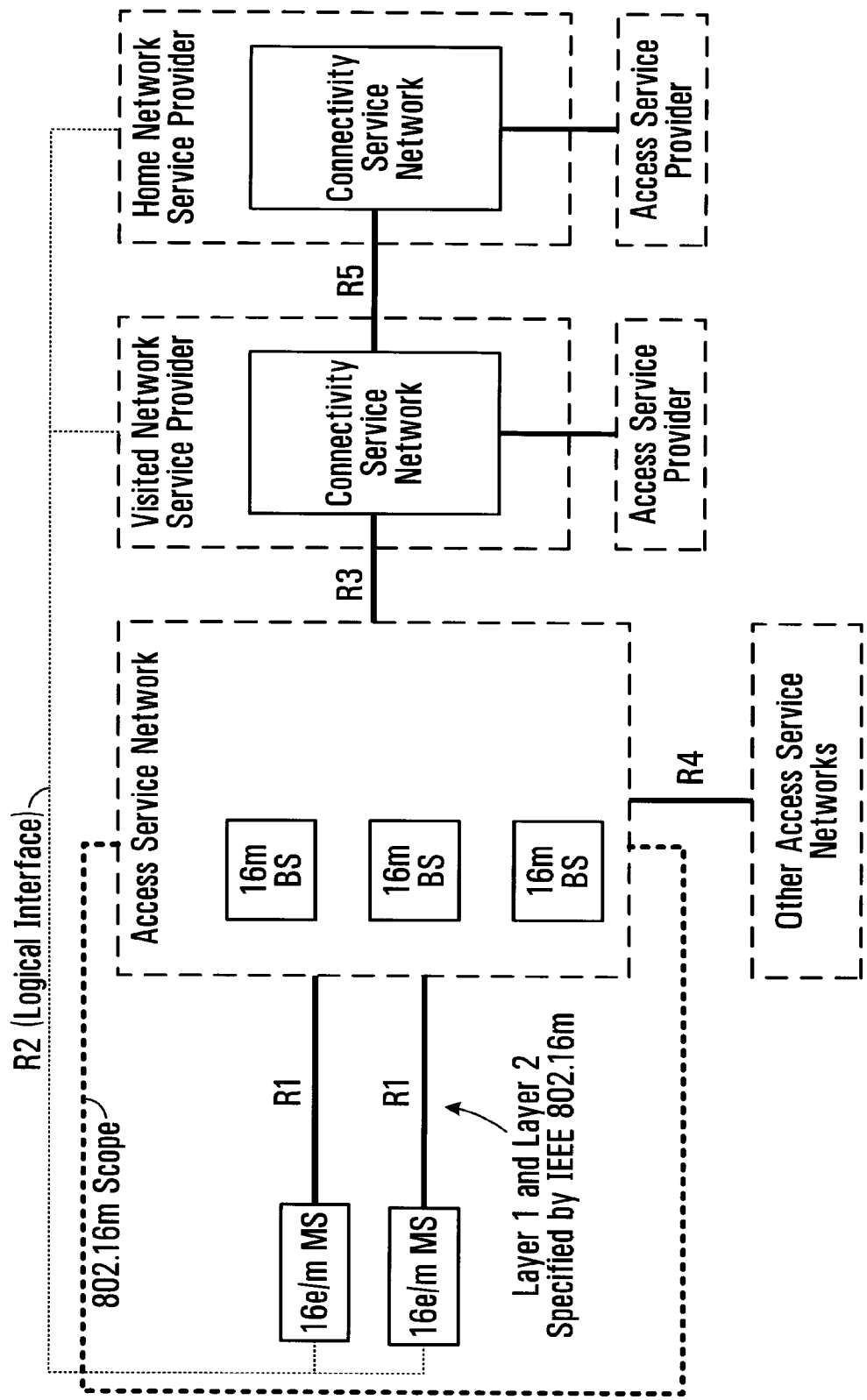
FIG. 7 is FIG. 1 of IEEE 802.16m-08/003r1, an example of overall network architecture.
Figure 8:
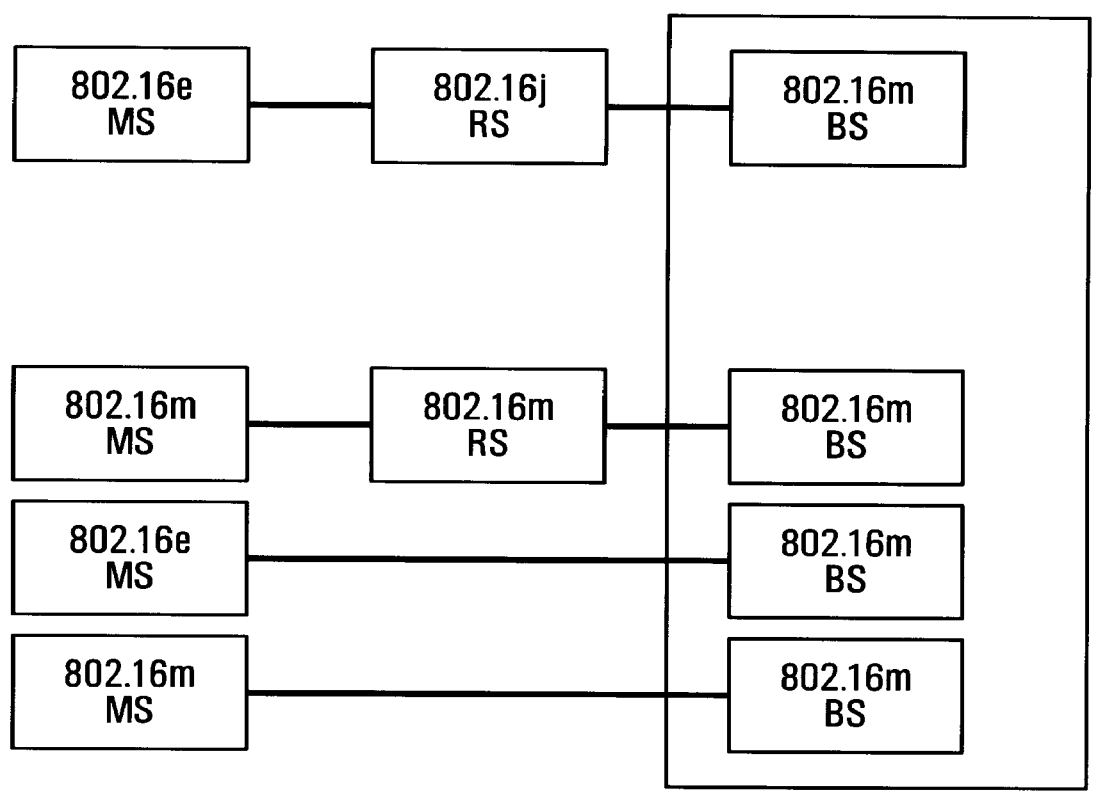
FIG. 8 is FIG. 2 of IEEE 802.16m-08/003r1, a relay station in overall network architecture.
Figure 9:
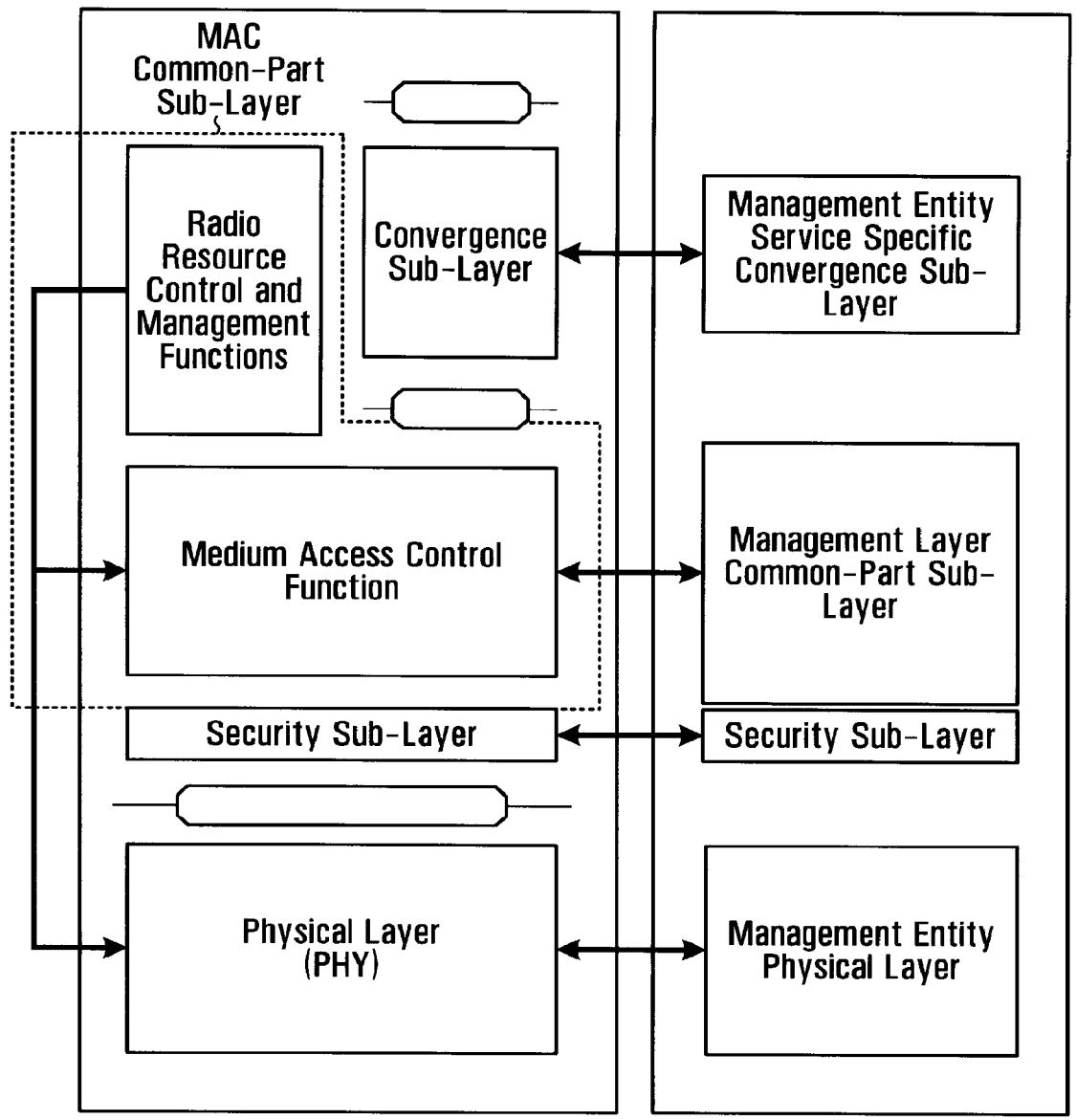
FIG. 9 is FIG. 3 of IEEE 802.16m-08/003r1, a system reference model.
Figure 10:
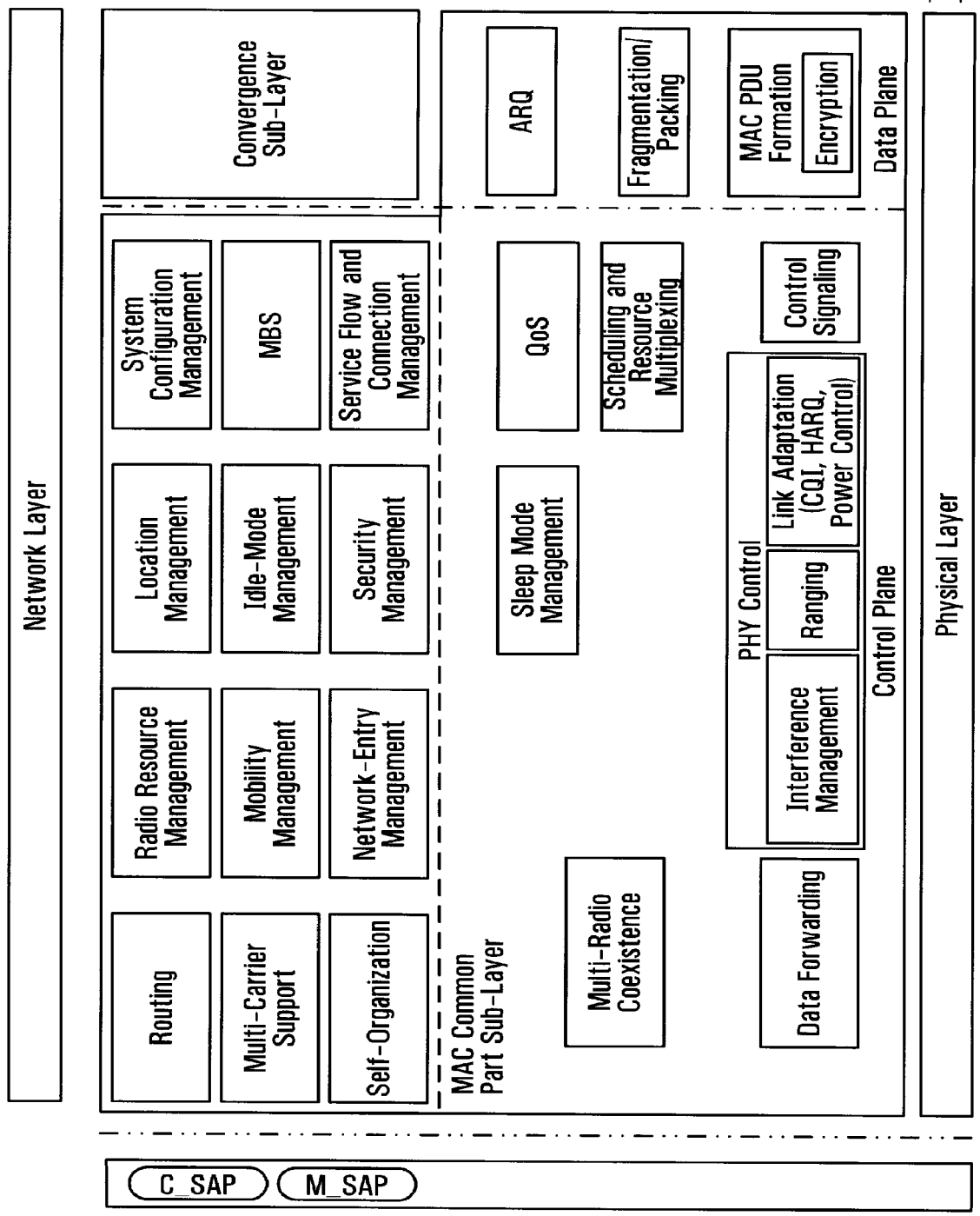
FIG. 10 is FIG. 4 of IEEE 802.16m-08/003r1, the IEEE 802.16m protocol structure.
Figure 11:
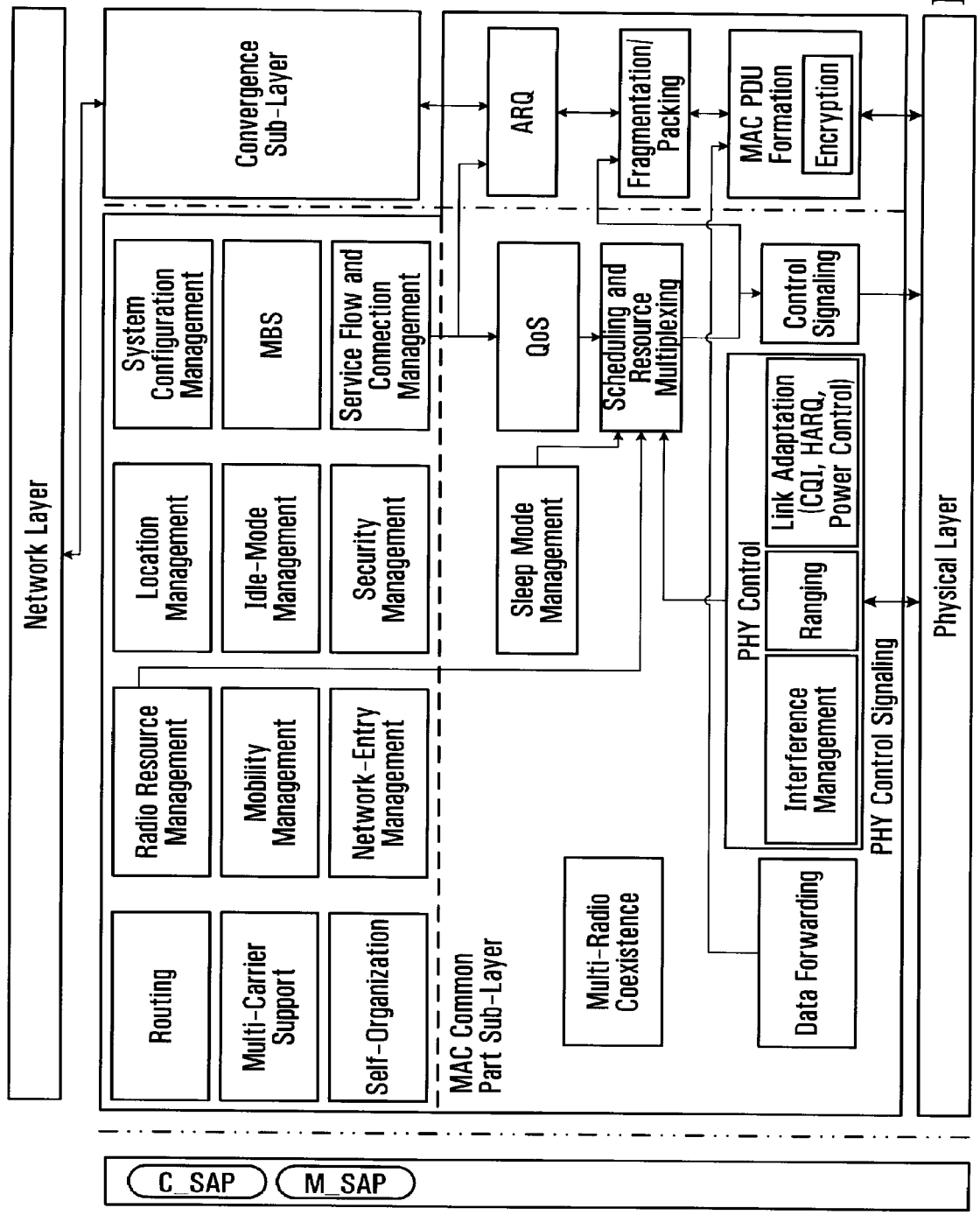
FIG. 11 is FIG. 5 of IEEE 802.16m-08/003r1, the IEEE 802.16m MS/BS data plane processing flow.
Figure 12:
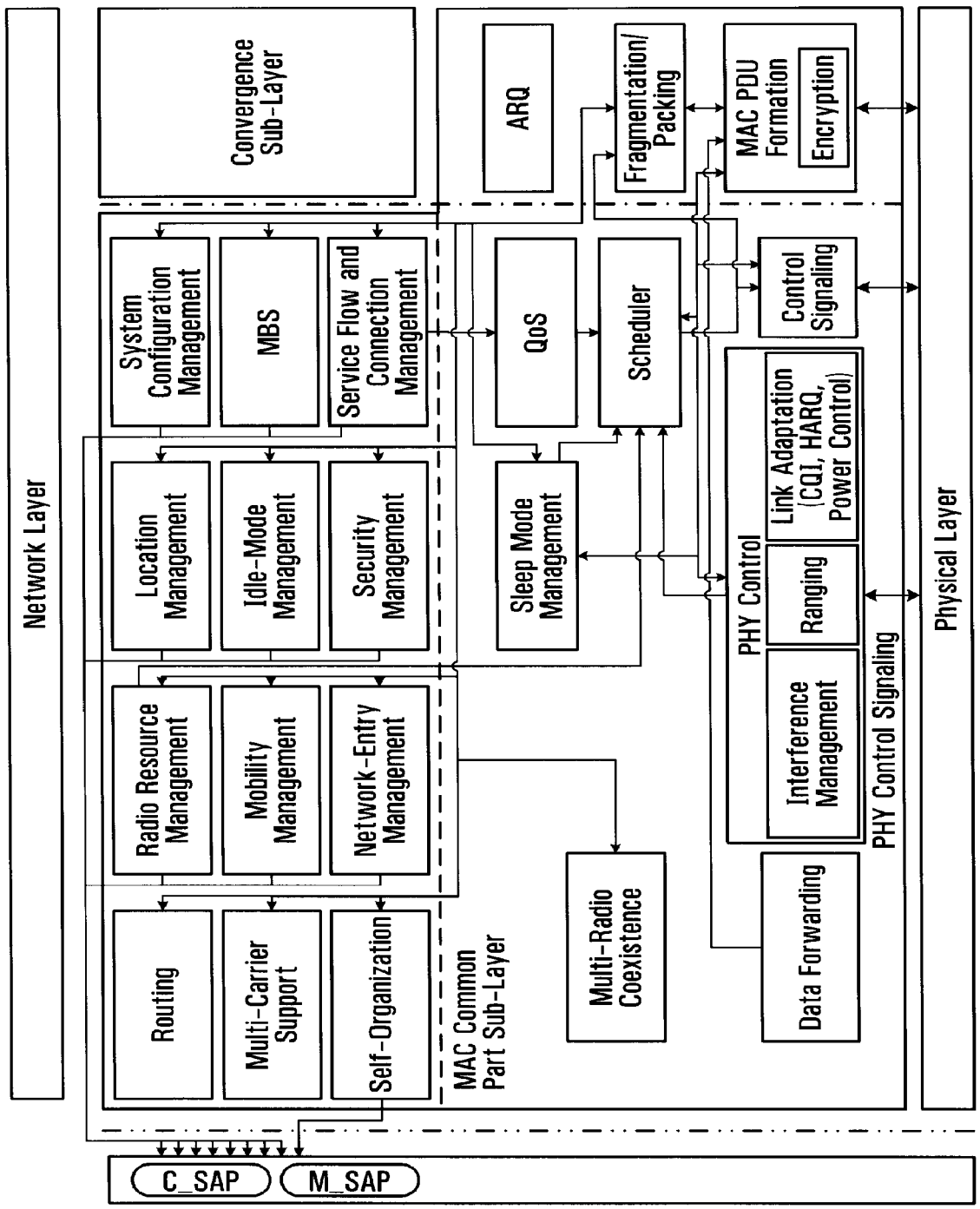
FIG. 12 is FIG. 6 of IEEE 802.16m-08/003r1, the IEEE 802.16m MS/BS control plane processing flow.
Figure 13:
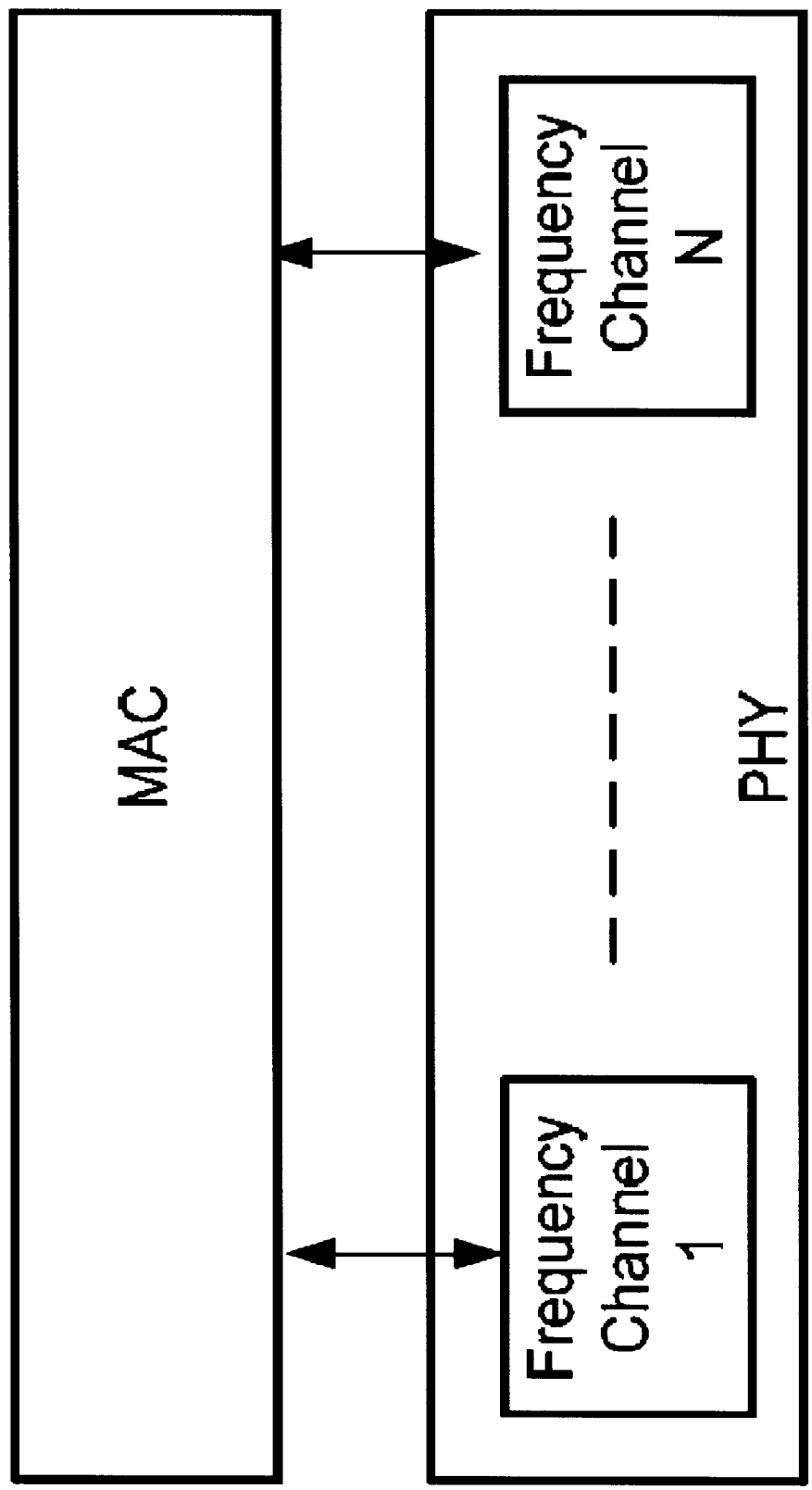
FIG. 13 is FIG. 7 of IEEE 802.16m-08/003r1, generic protocol architecture to support multicarrier system.

Reference is now made to FIG. 6 to illustrate reception of the transmitted signals by a mobile station 16, either directly from base station 14 or with the assistance of relay 15. Upon arrival of the transmitted signals at each of the antennas 40 of the mobile station 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practiced otherwise than as specifically described herein.

The invention claimed is:

1. A method for reception of uplink signaling at a base station from an access terminal of a plurality of access terminals, the method comprising:

at the base station:
using an uplink signaling scheme in which:
  a) a signaling location allocated for uplink signaling comprises at least one tile comprising a contiguous set of time-frequency resources within a transmission resource;
  b) each tile of the at least one tile comprises at least two sections;
  c) for each of the at least two sections of each tile, a respective set of sequences for transmission on that section of the corresponding tile is allocated;
assigning the access terminal a sequence from each of the sets of sequences; and
receiving from the access terminal the uplink signaling comprising a transmission on each section of the at least one tile using corresponding sequences assigned to the access terminal for each section of the at least one tile,
wherein a time-frequency location of the at least one tile in the transmission resource and/or the sequence from each of the sets of sequences is used by the base station to identify from which access terminal the transmission originates.

2. The method of claim 1, wherein each signaling location comprises a plurality of tiles that are distributed in frequency, and a mapping of sequences to sections of tiles in the plurality of tiles repeats for tiles in the plurality of tiles to exploit frequency diversity.

3. The method of claim 1, wherein each signaling location comprises a plurality of tiles that are distributed in frequency, and a mapping of sequences to sections of tiles in the plurality of tiles varies from tile to tile in the plurality of tiles.

4. The method of claim 1, wherein receiving the uplink signaling comprises receiving a resource request, and wherein the transmission resource comprises a control resource.

5. The method of claim 1, further comprising:
at the base station:
receiving access requests and/or resource requests from the access terminal independently for each of a plurality of services.

6. A base station configured for receiving uplink signaling from an access terminal of a plurality of access terminals, the base station comprising:
a transceiver for performing wireless communication with the plurality of access terminals;
processing hardware coupled to the transceiver, wherein the processing hardware is configured to cause the base station to:
  use an uplink signaling scheme in which:
    a) a signaling location allocated for the uplink signaling comprises at least one tile comprising a contiguous set of time-frequency resources within a transmission resource;
    b) each tile of the at least one tile comprises at least two sections;
    c) for each of the at least two sections of each tile, a respective set of sequences for transmission on that section of the corresponding tile is allocated;
  assign the access terminal a sequence from each of the sets of sequences; and
  receive from the access terminal the uplink signaling comprising a transmission on each section of the at least one tile using the corresponding sequences assigned to the access terminal for each section of the at least one tile,
wherein a time-frequency location of the at least one tile in the transmission resource and/or the sequence from each of the sets of sequences is used by the base station to identify from which access terminal the transmission originates.

7. The base station of claim 6, wherein each signaling location comprises a plurality of tiles that are distributed in frequency, and a mapping of sequences to sections of tiles in the plurality of tiles repeats for tiles in the plurality of tiles to exploit frequency diversity.

8. The base station of claim 6, wherein each signaling location comprises a plurality of tiles that are distributed in frequency, and a mapping of sequences to sections of tiles in the plurality of tiles varies from tile to tile in the plurality of tiles.

9. The base station of claim 6, wherein receiving the uplink signaling comprises receiving a resource request and the transmission resource comprises a control resource.

10. The base station of claim 6, wherein the processing hardware is further configured to cause the base station to:
receive access requests and/or resource requests from the access terminal independently for each of a plurality of services.

11. A non-transitory, computer accessible memory medium storing program instructions for receiving uplink signaling from an access terminal of a plurality of access terminals by a base station, wherein the program instructions are executable by one or more processors of the base station to cause the base station to:
use an uplink signaling scheme in which:
  a) a signaling location allocated for the uplink signaling comprises at least one tile comprising a contiguous set of time-frequency resources within a transmission resource;
  b) each tile of the at least one tile comprises at least two sections;
  c) for each of the at least two sections of each tile, a respective set of sequences for transmission on that section of the corresponding tile is allocated;
assign the access terminal a sequence from each of the sets of sequences; and
receive from the access terminal the uplink signaling comprising a transmission on each section of the at least one tile using the corresponding sequences assigned to the access terminal for each section of the at least one tile,
wherein a time-frequency location of the at least one tile in the transmission resource and/or the sequence from each of the sets of sequences is used by the base station to identify from which access terminal the transmission originates.

12. The non-transitory, computer accessible memory medium of claim 11, wherein each signaling location comprises a plurality of tiles that are distributed in frequency, and a mapping of sequences to sections of the tiles in the plurality of tiles repeats for tiles in the plurality of tiles to exploit frequency diversity.

13. The non-transitory, computer accessible memory medium of claim 11, wherein each signaling location comprises a plurality of tiles that are distributed in frequency, and a mapping of sequences to sections of tiles in the plurality of tiles varies from tile to tile in the plurality of tiles.

14. The non-transitory, computer accessible memory medium of claim 11, wherein receiving the uplink signaling comprises receiving a resource request and the transmission resource comprises a control resource.

15. The non-transitory, computer accessible memory medium of claim 11, wherein the program instructions are further executable to cause the base station to:

receive access requests and/or resource requests from the access terminal independently for each of a plurality of services.

16. A method for transmitting uplink signaling from a wireless device of a plurality of wireless devices to a base station, the method comprising:
by the wireless device:
using an uplink signaling scheme in which:
a) a signaling location allocated for the uplink signaling comprises at least one tile comprising a contiguous set of time-frequency resources within a transmission resource;
b) each tile of the at least one tile comprises at least two sections;
c) for each of the at least two sections of each tile, a respective set of sequences for transmission on that section of the corresponding tile is allocated;
receiving from the base station an assignment of a sequence from each of the sets of sequences; and
transmitting to the base station the uplink signaling comprising a transmission on each section of the at least one tile using the corresponding sequences assigned to the wireless device for each section of the at least one tile,
wherein a time-frequency location of the at least one tile in the transmission resource and/or the sequence from each of the sets of sequences is used by the base station to identify from which wireless device the transmission originates.

17. The method of claim 16, wherein each signaling location comprises a plurality of tiles that are distributed in frequency, and a mapping of sequences to sections of tiles in the plurality of tiles repeats for tiles in the plurality of tiles to exploit frequency diversity.

18. The method of claim 16, wherein each signaling location comprises a plurality of tiles that are distributed in frequency, and a mapping of sequences to sections of tiles in the plurality of tiles varies from tile to tile in the plurality of tiles.

19. The method of claim 16, wherein transmitting the uplink signaling comprises transmitting a resource request, and wherein the transmission resource comprises a control resource.

20. The method of claim 16, further comprising:
by the wireless device:
transmitting access requests and/or resource requests independently for each of a plurality of services.

21. A mobile station, comprising:
a transceiver for transmitting and receiving radio frequency signals;
processing hardware coupled to the transceiver, wherein the processing hardware is configured to cause the mobile station to:
use an uplink signaling scheme in which:
a) a signaling location allocated for uplink signaling comprises at least one tile comprising a contiguous set of time-frequency resources within a transmission resource;
b) each tile of the at least one tile comprises at least two sections;
c) for each of the at least two sections of each tile, a respective set of sequences for transmission on that section of the corresponding tile is allocated;
receive from a base station an assignment of a sequence from each of the sets of sequences; and
transmit to the base station the uplink signaling comprising a transmission on each section of the at least one tile using the corresponding sequences assigned to the mobile station for each section of the at least one tile,
wherein a time-frequency location of the at least one tile in the transmission resource and/or the sequence from each of the sets of sequences is used by the base station to identify from which mobile station the transmission originates.

22. The mobile station of claim 21, wherein each signaling location comprises a plurality of tiles that are distributed in frequency, and a mapping of sequences to sections of tiles in the plurality of tiles repeats for tiles in the plurality of tiles to exploit frequency diversity.

23. The mobile station of claim 21, wherein each signaling location comprises a plurality of tiles that are distributed in frequency, and a mapping of sequences to sections of tiles in the plurality of tiles varies from tile to tile in the plurality of tiles.

24. The mobile station of claim 21, wherein transmitting the uplink signaling comprises transmitting a resource request, and wherein the transmission resource comprises a control resource.

25. The mobile station of claim 21, wherein the processing hardware is further configured to cause the mobile station to:
transmit access requests and/or resource requests independently for each of a plurality of services.

26. A non-transitory, computer accessible memory medium storing program instructions for transmission of an uplink signaling to a base station, wherein the program instructions are executable by one or more processors to cause a wireless device to:
use an uplink signaling scheme in which:
a) a signaling location allocated for the uplink signaling comprises at least one tile comprising a contiguous set of time-frequency blocks within a transmission resource;
b) each tile of the at least one tile comprises at least two sections;
c) for each of the at least two sections of each tile, a respective set of sequences for transmission on that section of the corresponding tile is allocated;
receive from the base station an assignment of a sequence from each of the sets of sequences; and
transmit to the base station the uplink signaling comprising a transmission on each section of the at least one tile using the corresponding sequences assigned to the wireless device for each section of the at least one tile,
wherein a time-frequency location of the at least one tile in the transmission resource and/or the sequence from each of the sets of sequences is used by the base station to identify from which wireless device the transmission originates.

27. The non-transitory, computer accessible memory medium of claim 26, wherein each signaling location comprises a plurality of tiles that are distributed in frequency, and a mapping of sequences to sections of tiles in the plurality of tiles repeats for tiles in the plurality of tiles to exploit frequency diversity.

28. The non-transitory, computer accessible memory medium of claim 26, wherein each signaling location comprises a plurality of tiles that are distributed in frequency, and a mapping of sequences to sections of tiles in the plurality of tiles varies from tile to tile in the plurality of tiles.

29. The non-transitory, computer accessible memory medium of claim 26, wherein transmitting the uplink signaling comprises transmitting a resource request, and wherein the transmission resource comprises a control resource.

30. The non-transitory, computer accessible memory medium of claim 26, wherein the program instructions are further executable to cause the wireless device to:
  transmit access requests and/or resource requests independently for each of a plurality of services.

* * * * *